(12) United States Patent
Bong et al.

(10) Patent No.: US 7,429,716 B2
(45) Date of Patent: Sep. 30, 2008

(54) MODULAR WELDING SYSTEM

(76) Inventors: William L. Bong, 1175 Nimitz Ave., Vallejo, CA (US) 94592-1001; Charles A. Bock, 1175 Nimitz Ave., Vallejo, CA (US) 94592-1001

( * ) Notice: Subject to any disclaimer, the term of this patent is extended or adjusted under 35 U.S.C. 154(b) by 0 days.

(21) Appl. No.: 10/731,414

(22) Filed: Dec. 9, 2003

(65) Prior Publication Data
US 2005/0023262 A1 Feb. 3, 2005

Related U.S. Application Data

(63) Continuation of application No. 09/804,686, filed on Mar. 12, 2001, now abandoned, which is a continuation-in-part of application No. 09/058,741, filed on Apr. 10, 1998, now Pat. No. 6,297,472.

(60) Provisional application No. 60/188,782, filed on Mar. 13, 2000.

(51) Int. Cl.
*B23K 9/12* (2006.01)
(52) U.S. Cl. ................................. 219/125.1
(58) Field of Classification Search ............... 219/73.1, 219/124.34, 125.1, 125.12, 137.7, 73, 125.11; 248/646
See application file for complete search history.

(56) References Cited

U.S. PATENT DOCUMENTS 2,818,494 A * 12/1957 Bernard et al. ........... 219/137.7
3,501,613 A * 3/1970 Cornell, Jr. ............... 219/137.9
3,518,397 A * 6/1970 Hannahs .................... 219/73.1
3,543,810 A * 12/1970 Scheller ................... 219/137.8
4,163,886 A * 8/1979 Omae et al. ............ 219/125.11
4,959,523 A * 9/1990 Fihey et al. .............. 219/125.1
5,148,000 A * 9/1992 Tews ..................... 219/125.11
5,232,192 A * 8/1993 Akutagawa ................. 248/646
5,932,123 A * 8/1999 Marhofer et al. ....... 219/125.11
6,177,650 B1 * 1/2001 Watanabe et al. ........ 219/125.1

* cited by examiner

*Primary Examiner*—Clifford C. Shaw
(74) *Attorney, Agent, or Firm*—Charles L. Thoeming; Michael A. Kerr

(57) ABSTRACT

A modular welding system for performing quick, easy and high quality welds. The modular welding system comprises a basic component system and a modular fixture component system. The basic component system provides the basic components which are needed to perform a quality weld efficiently. The modular fixture component system interfaces with the basic component system and provides a particular welding fixture assembly that performs a particular type of weld. More particularly, a stiffener type modular fixture component system and a butt/tee type modular fixture system are described. However, any other particular fixture type system may be integrated with the basic component system of the present invention.

24 Claims, 16 Drawing Sheets

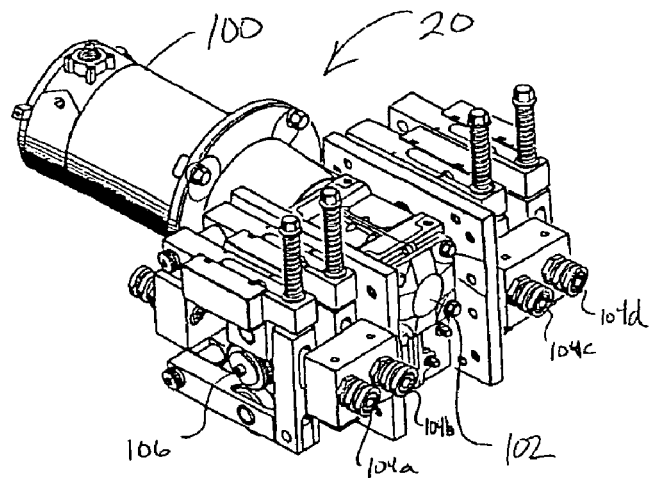
FIG. 4a
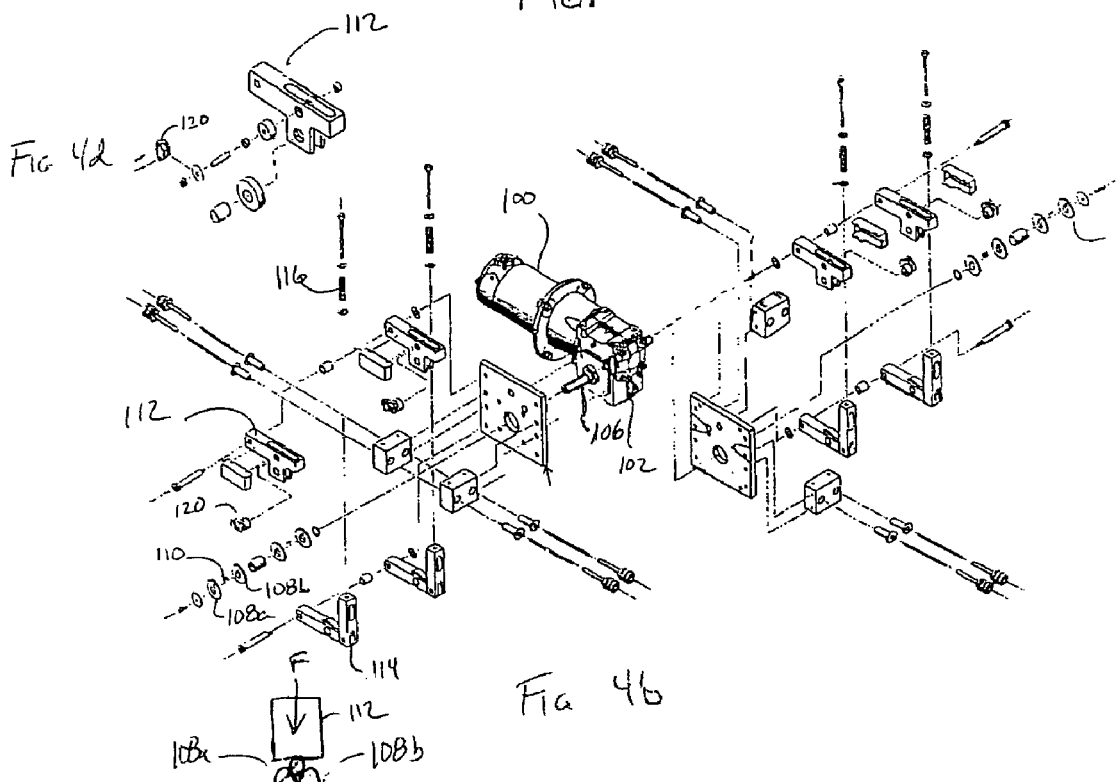
FIG. 4d
FIG. 4b
FIG. 4c

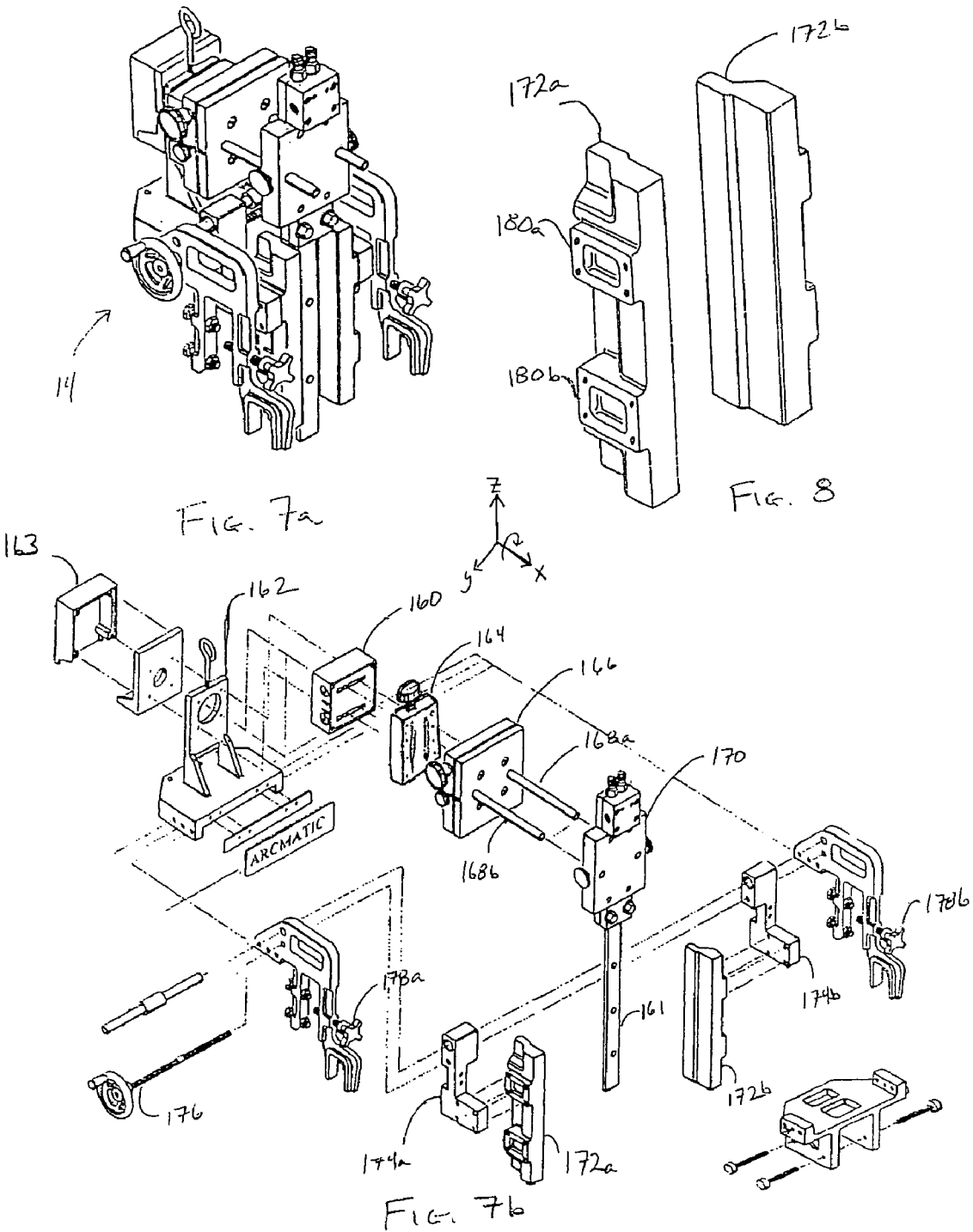

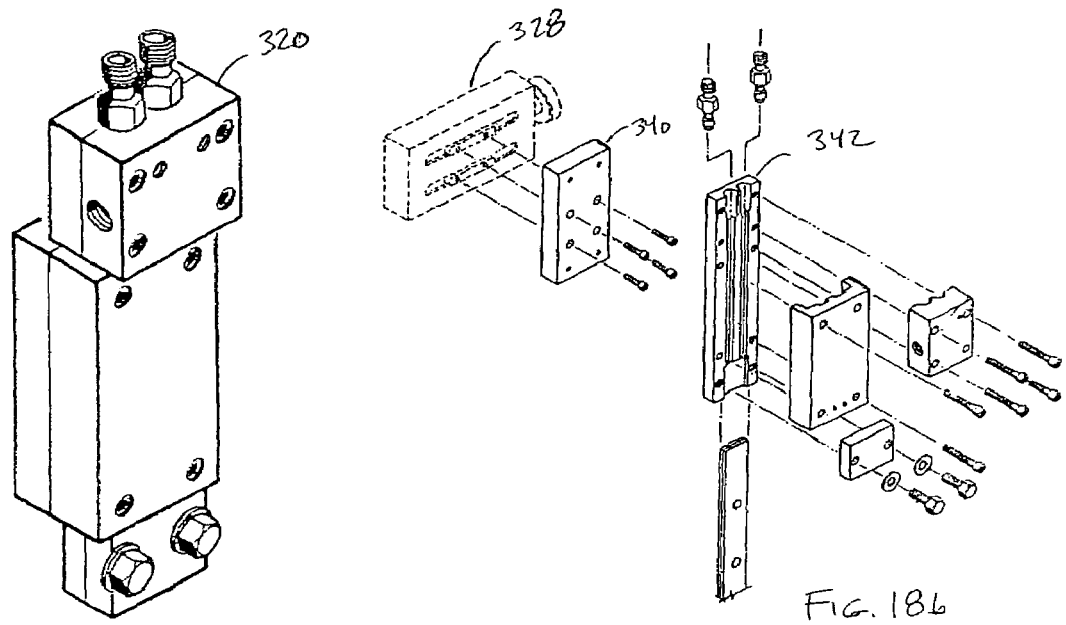
FIG. 18a
FIG. 18b
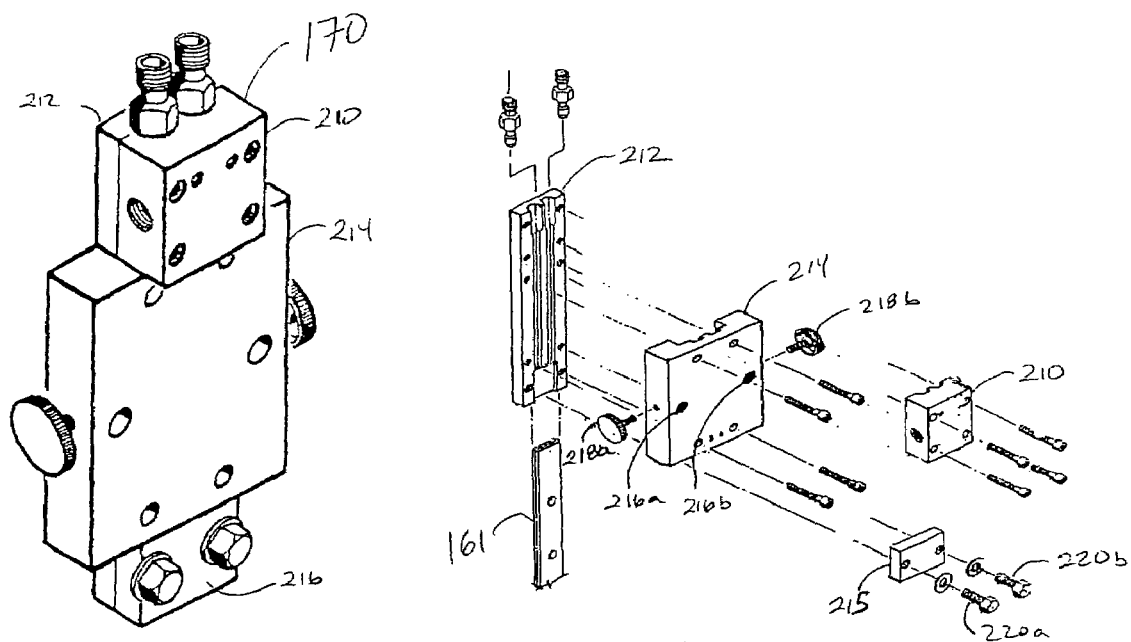
FIG. 10a
FIG. 10b

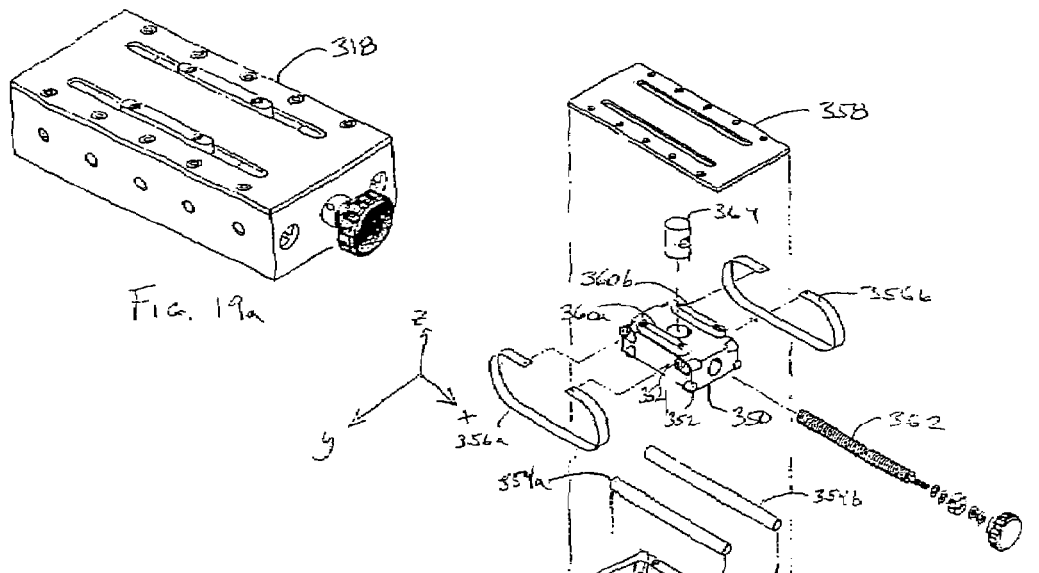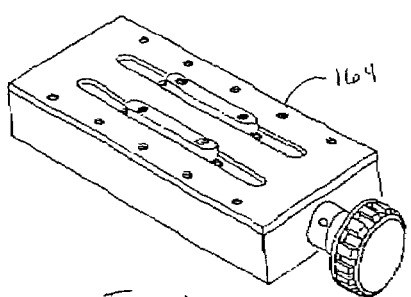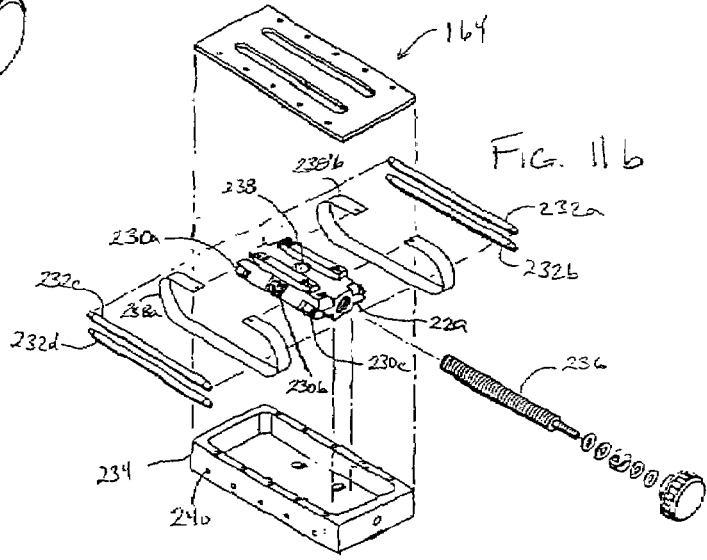

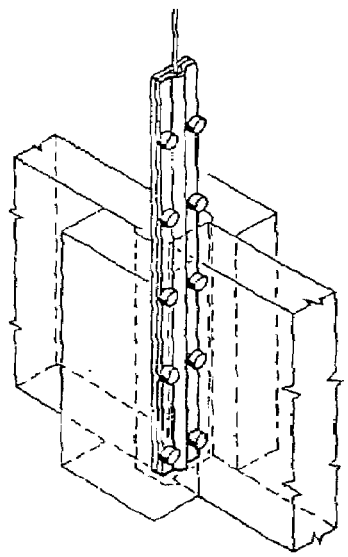
Fig. 13.c
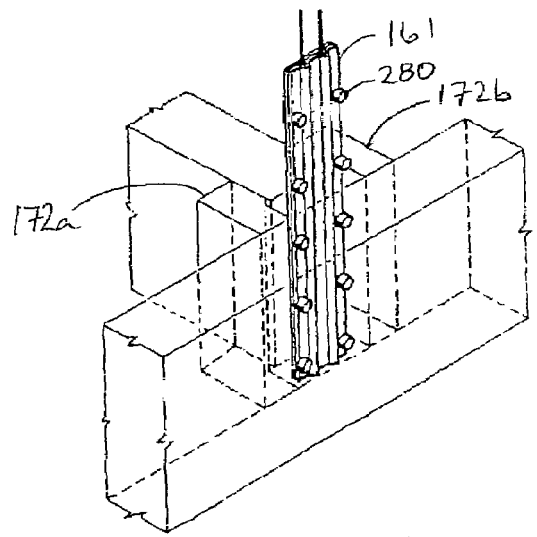
Fig. 13a
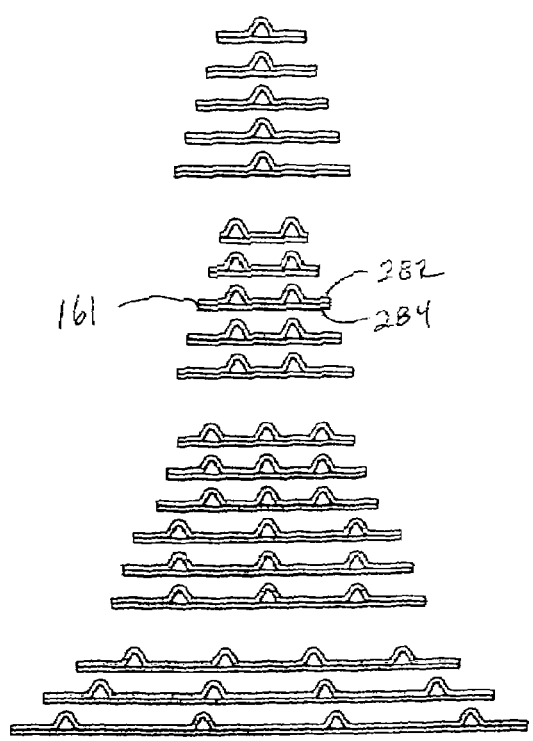
Fig. 13b

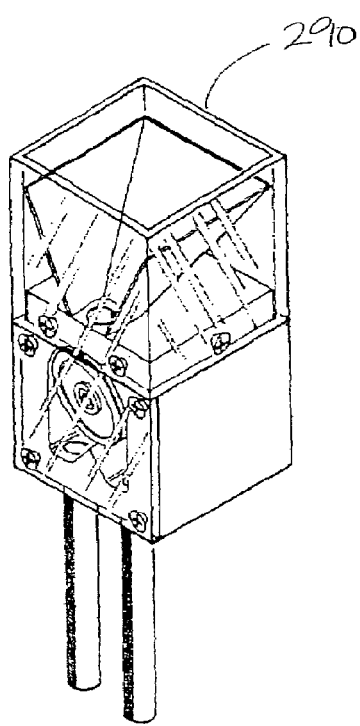
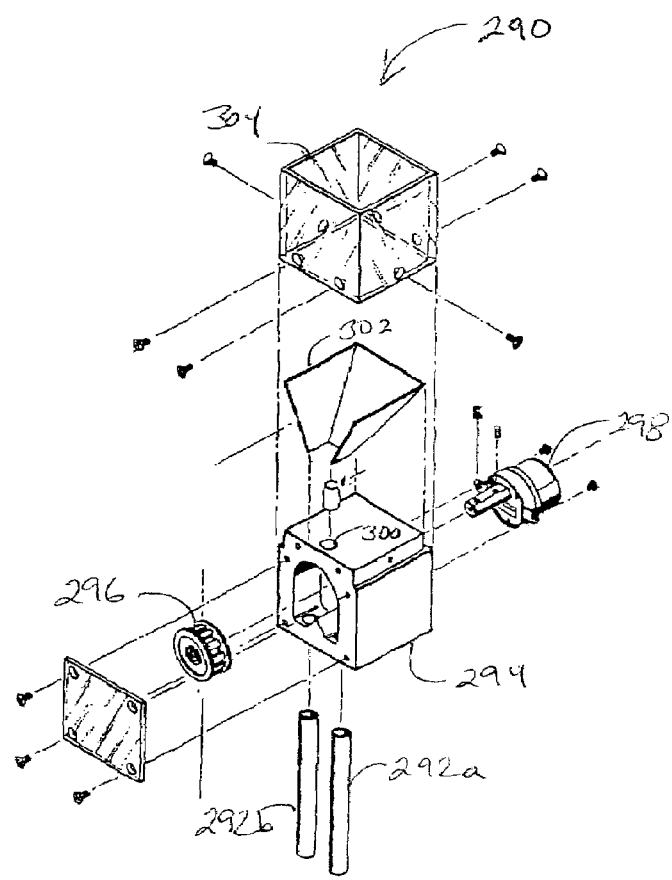
FIG. 14a
FIG. 14b

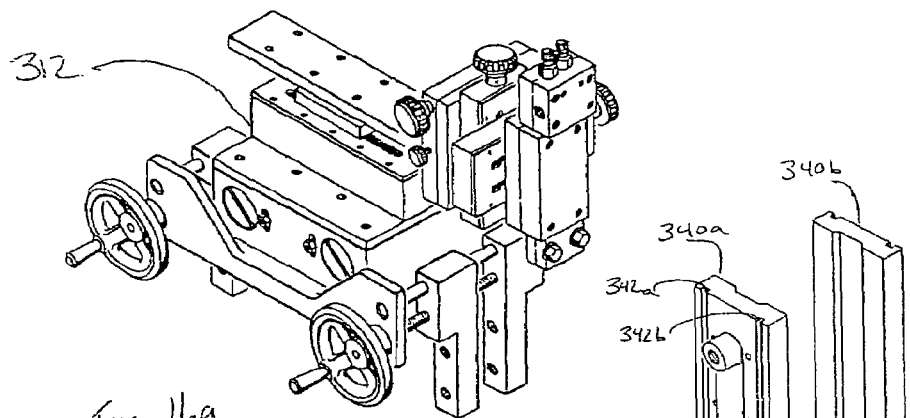
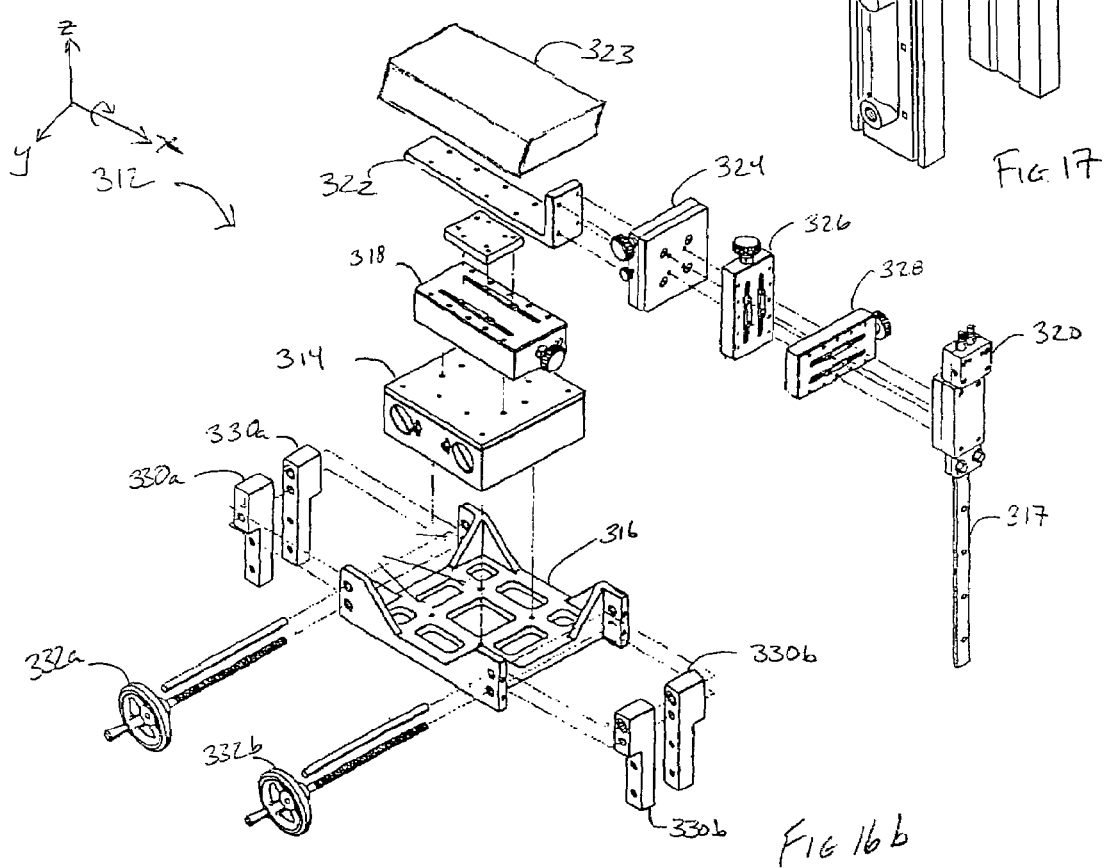

MODULAR WELDING SYSTEM

CROSS REFERENCE

This patent application is a continuation application of patent application Ser. No. 09/804,686, (now abandoned) having a filing date of Mar. 12, 2001, which is a continuation-in-part of patent application Ser. No. 09/058,741 having a filing date of Apr. 10, 1998 and issuing as U.S. Pat. No. 6,297,472 on Oct. 2, 2001. This patent application is also related to provisional patent application 60/188,782 filed Mar. 13, 2000, which is hereby incorporated by reference.

BACKGROUND OF THE INVENTION

1. Field of the Invention

This invention pertains generally to devices and methods for metal welding. More particularly, the invention is a modular welding system and method which provides for quick, easy and accurate vertical welds using a light weight, portable welding fixture.

2. Description of the Background Art

When welding metal items together using arc or gas welding techniques, horizontal welding has traditionally been easier and less expensive to carry out than vertical welding. While welding metal substrates with conventional welding methods or plates together in a horizontal position, gravity assists in keeping the molten weld puddle in place and facilitates the formation of high quality welds. With vertical welding of metal substrates, the molten weld puddle is much more difficult to control, and the weld is correspondingly more expensive and time-consuming to perform. For this reason, structural steel fabricators go to great lengths to position metal substrates in a horizontal relationship during welding and thereby avoid vertical welds.

The problems associated with making vertical welds are particularly evident in the welding of "stiffener" plates into steel I beams or H columns for use in building construction. These stiffeners are used to transfer the moment load through a vertical column when a horizontal column is welded to it. The welding of stiffeners into structural beams is one of the most common welding operations and consumes thousands of man-hours per year for a typical structural steel fabricator. The stiffener plates are welded to the web and flanges of a column in a position which is normal to the web and flanges of the column. Thus, the weld connecting the stiffener plate to the web is at a right angle to the welds which join the stiffener plate to the flanges, and to complete all of the welds, the steel fabricator must either continually reposition the heavy steel beam to maintain a horizontal position for each weld, or must carry out difficult vertical welds.

Heretofore, the most common method of welding stiffeners into beams or columns has been through use of conventional "flux-cored" welding wire methods. Flux-cored welding generally involves filling weld joints with weld metal from a flux cored welding wire. The wire is made from a flat metal strip which is drawn into a hollow tube, filled with a powdered flux material, and rolled on a spool. During welding, the wire is unwound from the spool and fed through a flexible cable or conduit by a wire feeder device to a welding gun. When an operator presses the trigger on the gun, the wire is fed out of the gun and strikes an arc on the parent material to be welded. The arc energy melts the wire and parent material to form a homogeneous weld of fused wire and parent material.

In order to properly weld stiffeners in place on columns using flux-cored welding, the stiffener plate and weld joint must be properly prepared so that the weld will meet the AWS (American Welding Society) code requirements. Generally, the stiffener is first cut from a standard piece of mill plate and then bevel cut on three sides and ground clean to remove any mill scale. Back-up bars, which retain molten metal in place during welding, are then prepared for a fit-up operation wherein the stiffener plate is carefully positioned relative to the column. The person carrying out the fit-up operation must weld the stiffener and backup bars to the column such that a constant ⅜ inch gap is maintained between the stiffener plate and the parent material of the column. If the gap is too narrow, the stiffener must be ground until the proper gap is achieved. If the gap is too wide, the weld will require more metal (and thus more weld passes) to fill. Many welding or construction codes require that the backup bars be removed after the stiffener has been welded in place. Such removal is difficult and expensive, and generally requires gouging out the backup bars with a carbon arc, followed by additional weld passes to fill in the gouged areas.

Small structural steel fabricators generally weld stiffeners into columns using flux-cored wire welding while the columns are horizontally positioned between two upright supports, with the columns being continually flipped or repositioned for each weld to avoid vertical welding. Since the columns generally are very heavy, an overhead crane is used to lift the columns for repositioning. This process is very time consuming and expensive. Additionally, multiple weld passes are required to fill each weld joint, with thicker stiffener plates requiring more weld passes. After each weld pass, the operator must stop and chip off the slag covering the weld before the next weld pass. If any defects occur, the defect must be gouged out with a carbon arc and re-welded.

Larger structural steel fabricators sometimes use "pit welding" or "platform welding" for installing stiffeners, wherein columns are positioned vertically so that all three sides of the weld joint are in a horizontal or flat "hog-trough" position. Since the column is vertical, the stiffener is horizontal and the welds on all three sides are made in the horizontal position. The stiffener is beveled on all three sides, and is cut so that a ⅜-inch gap is created between the stiffener and the inside of the column. When the operator welds the first weld pass, this backup bar retains the molten metal from falling through the gap, and prevents oxygen contamination of the molten puddle from the back side. This arrangement also allows a much larger puddle during welding, and requires fewer weld passes to fill each weld joint. However, the backup bar must be removed in most application, requiring the operator to remove it after the joint has been filled. This is accomplished by arc gouging the backup bar from the back side of the stiffener and making several weld passes to fill up the void caused by the arc gouging. Again the removal of this backup bar is very time consuming and expensive. The removal of the backup bar requires that the beam be removed from the pit and welded horizontally; or that the beam be removed from the pit, turned upside down, returned to the pit and the backup bar removed and the stiffener backside rewelded. Handling and positioning the vertically oriented columns is difficult and requires an overhead crane and the use of a pit and/or platform, thus requiring a large amount of work space. Further, the location of the welding operation is generally not at ground or floor level when using pit or platform welding techniques, and can require the welding operator to be awkwardly or precariously positioned on a platform or ladder during the welding operation.

A vertical welding technique known as "electroslag" welding (ESW) has been developed to overcome the difficulties associated with repositioning columns or other heavy substrates in order to permit horizontal welds. The electroslag method generally involves bringing the ends of two vertically-oriented plates or substrates together such that a ¾ inch to one inch gap remains between the ends of the plates. Copper welding shoes are then placed on each side of the gap to form a vertical channel or cavity between the plates and welding shoes. This cavity is filled with weld metal by placing a steel guide tube into the cavity to feed welding wire into the channel. When the welding wire feeds out the bottom end of the guide tube, an arc is struck against the parent material and a molten puddle is formed. A granular flux material is sprinkled into the channel during welding, which melts to form a conductive slag. The arc is extinguished by the conductive slag, which remains molten due to the resistance to the electric current passing between the welding wire and the substrates. Heat generated by the resistance of the molten slag melts the welding wire and fuses the molten metal to the substrates to form the weld. The welding wire is continually fed into the weld. The bottom of the guide tube is melted off by the heat of the molten flux puddle, and is therefore consumed into the molten weld puddle. This process is called "consumable guide" electroslag welding. The guide tube can remain stationary during the welding process, or can be oscillated from side to side. If the guide tube remains stationary, the width of the guide tube must match the thickness of the plates being welded. If the guide tube is oscillated, a large variety of plate thicknesses can be welded with one size guide tube. If oscillation is used, the guide tube is oscillated or reciprocated within the cavity, and the cavity is filled with molten metal to join the plates together. The guide tube is consumable and contributes to the weld metal. The copper shoes retain the weld puddle in place, and are removed when the weld is completed. The use of copper shoes eliminate the need for steel backup bars that must be removed after welding—saving time and money. A comprehensive description of electroslag welding is provided in the American Welding Society *Welding Handbook*, eighth edition, which is incorporated by reference.

While the electroslag process permits vertical welds, it has previously not met with much success due to the large amount of time required to set up prior to welding. Particularly, it is difficult and time consuming to position and secure the copper shoes about the gap between the substrates that are to be welded. In the case of electroslag welding of stiffeners onto columns, "L"-brackets generally must be cut and welded into place between the flanges and stiffener in order to support the copper shoes, with two L-brackets required for each weld. After the L-brackets are welded in place, steel wedges are pounded in place between the L-brackets and copper shoes to hold the shoes in position. When the weld is finished, the brackets must be removed.

Another drawback associated with conventional electroslag welding is that that the guide tube must be carefully positioned within the gap to be welded, which requires careful alignment of the welding head and welding oscillator mechanism. Incorrect alignment of the guide tube can result in contact of the guide tube with tone of the copper shoes during welding, causing a 500 to 2000 Amp short, which will generally destroy the (expensive) copper welding shoe and interrupt the welding operation. Any such interruption of an electroslag weld operation is very inconvenient, and expensive, and generally requires gouging out the incomplete weld and starting the entire operation over.

Still another drawback of conventional electroslag welding is that the molten flux puddle in the weld cavity can cause the welding wire to fuse to the bottom of the guide tube during welding, which prevents wire from feeding into the weld. The welding then must be interrupted, the copper shoes removed, and the weld area cleaned or ground down to allow set up for a new weld start. As noted above, the interruption of an electroslag weld in such a manner requires expensive and time consuming cleanup of the incomplete weld followed by starting the weld operation over again.

Welding controllers or control systems have been developed to facilitate electroslag welding by controlling wire feed rate, welding power supply output, and oscillation, but such controllers generally bulky and heavy, and typically provide for only one type of weld condition. If the weld condition varies during welding, defects may occur to the weld, or a catastrophic short against one of the copper welding shoes may occur. For these reasons, electroslag welding of stiffeners onto columns has not proved economical, and the welding industry has continued to use the flux-cored wire welding method. Further, previously known welding control systems have been based on centralized control architectures having a star topology. These control systems are generally not scaleable or adaptable to changing needs or different types of welding operations. Generally, the central processor board for such systems must be re-designed and modified to meet new requirements Accordingly, there is a need for a welding system and method which overcomes the drawbacks presently associated with the currently-used flux-cored wire welding and electroslag welding methods, which eliminates the need for frequent re-positioning of heavy steel columns or other substrates during welding operations, which allows quick and easy vertical welding with minimal set up time, which uses light weight, portable equipment, which prevents unwanted interruption of welding operations, and which provides a distributed control system to allow defect free welds under a variety of weld conditions. The present invention satisfies these needs, as well as others, and generally overcomes the deficiencies of conventional electroslag welding and flux-cored wire welding methods, and the drawbacks found generally in the background art.

SUMMARY OF THE INVENTION

The present invention is a modular welding system which allows quick and easy fabrication of high quality vertical welds under varying conditions, reducing extensive set up time or use of heavy equipment. The modular welding system is comprised of two main groups, a basic component system and a modular fixture component system. Preferably, all of the components associated with the basic component system are coupled to an articulated boom. Each of the modular fixture systems is suspended from the end of the articulated. Each modular fixture component system has a particular fixture assembly that performs a particular type of weld, yet can still interface with the same basic component system.

By way of example and not of limitation, the welding system includes two different modular fixture component systems, namely, a heavy duty butt/tee welding fixture and a stiffener welding fixture. The heavy duty butt/tee welding fixture is used for heavy plate butt weld and tee welds which are common to bridge building. The stiffener welding fixture is used for a making stiffener-to-flange welds which is common to structural steel fabrication and is a lighter fixture than the butt/tee welding fixture.

Each of the modular fixture component systems can be operatively coupled to the basic component system by attaching the selected modular fixture component system physically and electrically to the basic component system.

More particularly, the basic component system includes an articulated boom assembly, an articulated boom lift, a wire feeder, a straightener, an articulated wire guide, a water circulator, an operator's control module, a wire feed/straightener control module, and a welding power supply control module.

The butt/tee welding fixture component includes a butt/tee fixture frame, an oscillator slide, an oscillator control module, a plurality of manual slides, a holding arm for a weld torch assembly, a welding torch rotator, a plurality of welding shoes, a butt/tee welding torch, and a plurality of wire feed conduits.

The stiffener welding fixture component includes a stiffener fixture frame, a motorized oscillator slide, an oscillator control module, at least one manual slide, a holding arm for a weld torch assembly, a welding torch rotator, a plurality of welding shoes, a stiffener welding torch, and a plurality of wire feed conduits.

By way of example, during an electroslag welding process "consumables" are used to join parent materials with welding materials. By way of example and not of limitation, the consumables used in an electroslag process may include welding wire, flux, and a consumable guide tube. Preferably, a welding wire comprising metal cored wire is used. During electroslag welding, it is preferable that a low moisture welding flux be used. The consumable guide tube can be manufactured in various sizes to fit a variety of applications and generally include single wire guide tubes, two wire guide tubes, three wire guide tubes, and four wire guide tubes.

In operation, a welding program is submitted to the operator's control module by an operator. The welding program is input by an operator of the welding system, however, the welding program may be generated off-site by another third party. The operator's control module is the operator's input to program the welding operation. However, since most welding operators are not adept and computer programming, the control panel has been designed to look like a standard analog control panel—which most welding operator's are familiar with. When the operator enters variables into the operator's control panel, he uses push buttons, paddle switches, rocker switches, and control knobs. He feels comfortable and competent in programming the panel in this way, because this is the way he has been trained to use existing competitive analog systems. The operator's control panel, however, is a digital computer. When the operator pushes a button, or turns a know, he is programming the computer. The programming operation is completely transparent to the operator. After the welding variables have been entered into the panel by the operator, the control module communicates the welding program to a wire feed/straightener control module, a power supply control module and a oscillation control module. The wire feed/straightener control module controls the wire feed speed from the wire feeder and the wire straightener. The power supply module controls the power supply. The operator control module, wire feed/straightener, and the power supply module are part of the basic component system. An oscillation control module resident on the modular fixture component module controls the oscillation of the oscillation slide which oscillates the weld torch.

BRIEF DESCRIPTION OF THE DRAWINGS

The invention will be more fully understood by reference to the following drawings which are for illustrative purposes only.

FIG. 4a is a perspective view of a wire feeder.

FIG. 4b is a perspective view showing the assembly of the wire feeder.

FIG. 4c shows how forces are applied to the welding wire in the wire feeder.

FIG. 4d is a detailed view of the shaft encoder and roll arm of the wire feeder.

FIG. 7a is a perspective view of the stiffener fixture module.

FIG. 7b is a view showing the assembly of the stiffener fixture module.

FIG. 8 is a perspective view of the weld shoes.

FIG. 10a is a perspective view of the stiffener fixture weld torch.

FIG. 10b is a perspective view of the assembly of the stiffener fixture weld torch.

FIG. 11a is a perspective view of a manual adjusting slide for the stiffener fixture.

FIG. 11b is a perspective view showing the assembly of the manual adjusting slide for the stiffener fixture.

FIG. 13a is a perspective view of a guide tube using stiffener weld shoes.

FIG. 13b is a perspective view of a variety of guide tubes.

FIG. 13c is a perspective view of a guide tube using butt/tee weld shoes.

FIG. 14a is a perspective view of a flux dispenser.

FIG. 14b is a perspective view of the assembly of the flux dispenser.

FIG. 16a is a perspective view of the butt/tee fixture module.

FIG. 16b is a perspective view of the assembly of the butt/tee fixture module.

FIG. 17 is a perspective view of the butt/tee weld shoes.

FIG. 18a is a perspective view of a butt/tee weld torch.

FIG. 18b is a perspective view of the assembly of the butt/tee weld torch.

FIG. 19a is a perspective view of the heavy duty manual slide.

DETAILED DESCRIPTION

Referring more specifically to the drawings, for illustrative purposes the present invention is embodied in the system shown generally in FIG. 1 through FIG. 21. It will be appreciated that the system may vary as to configuration and as to details of the parts. The invention is disclosed generally in terms of heavy plate welding which may be applied to electroslag or electrogas welding. However, the invention may be used in a large variety of welding applications which employ a basic component system and a modular fixture component system, as will be readily apparent to those skilled in the art.

Figure 1:
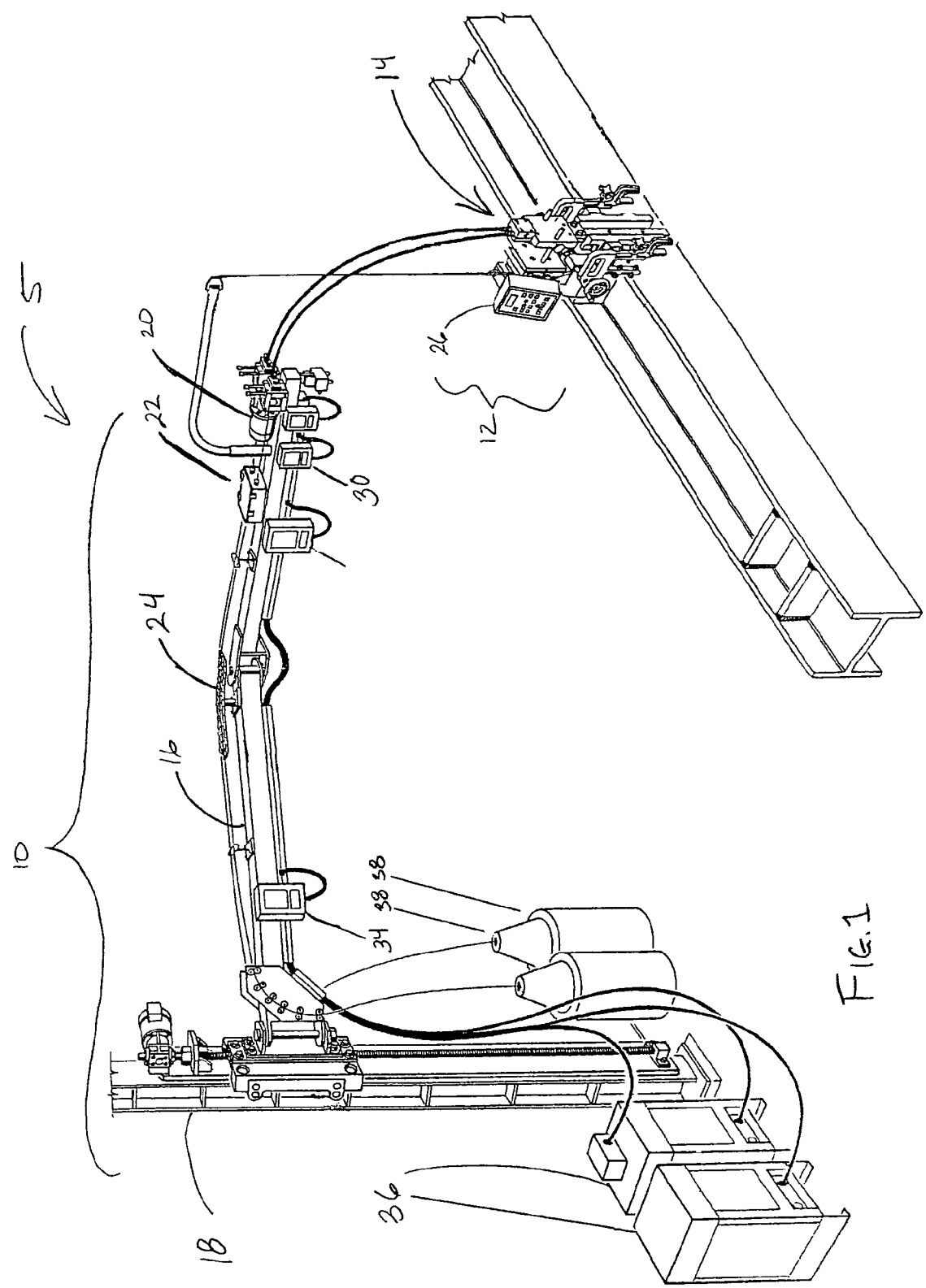
FIG. 1 is a perspective view of a welding system having a stiffener welding fixture.

FIG. 1 is a perspective view of a welding system having a stiffener welding fixture. The welding system 5 includes a basic component system 10 and a modular fixture component system 12 which is a stiffener welding fixture 14. The basic component system 10 includes an articulated boom assembly 16, an articulated boom lift 18, a wire feeder 20, a motorized wire straightener 22, an articulated wire guide 24, a water circulator (not shown), an operator's control module 26, a wire feed/straightner control module 30, a welding power supply control module 34, control cable assemblies, power cable assemblies, water cooling hoses, and air hoses.

The basic component system receives power from a power supply 36 and welding wire from welding wire drums 38.

The modular fixture component system 12 is a stiffener welding fixture 14 and is described in further detail in FIG. 7a. However, for purposes of providing an overview of the stiffener welding fixture 14, the fixture 14 includes a stiffener fixture frame, a motorized oscillator slide, an oscillator motor control module, a manual slide, a holding arm for a weld torch assembly, a welding torch rotator, a plurality of welding shoes, a stiffener welding torch, and a plurality of wire feed conduits.

Figure 2A:
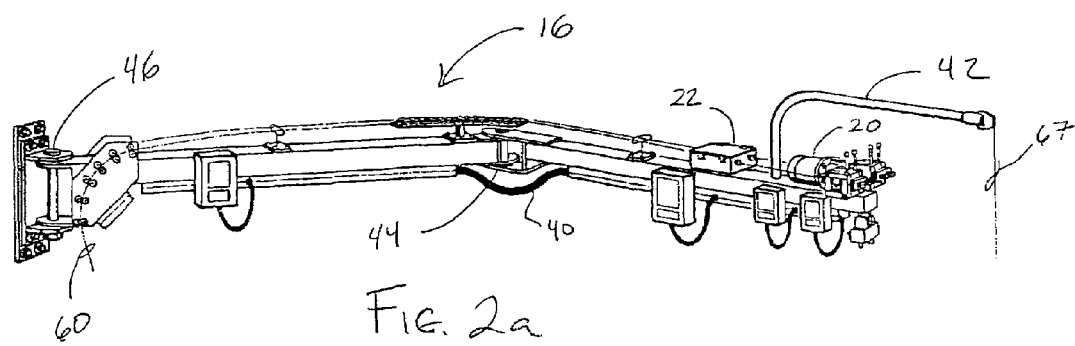
FIG. 2a is a perspective view of the articulated boom assembly.

FIG. 2a is a perspective view of the articulated boom assembly 16. The articulated boom assembly 16 carries the weight of the wire feeder 20, wire straightener 22, cable and hose assemblies 40 and the counterbalance arm 42 which holds the weight of the modular fixture component system 12. The arm articulation has pivot points 44 and 46 comprising swivel pins. The pivot points 44 and 46 allow the welding operator to quickly position the welding fixture with ease.

Figure 2B:
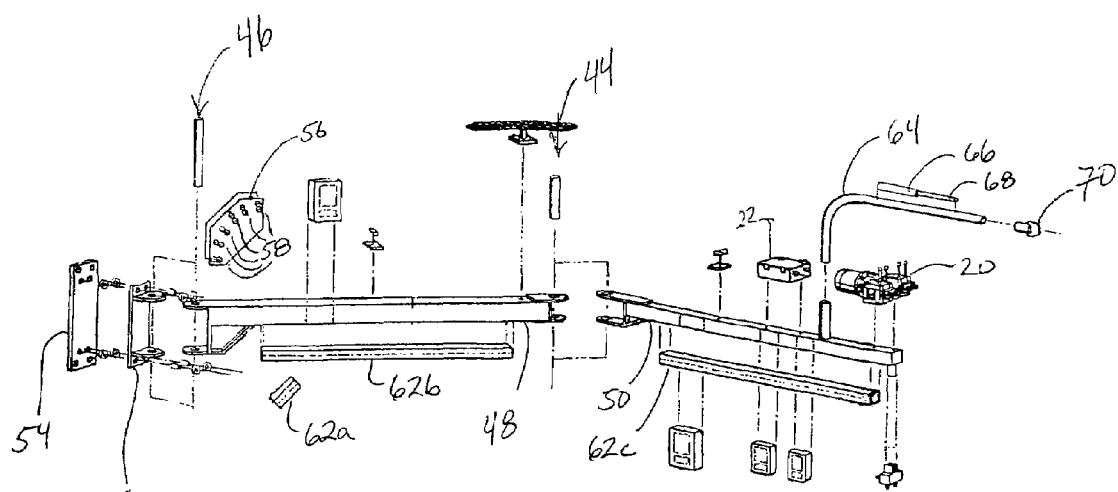
FIG. 2b is a perspective view of the articulated boom assembly showing how the boom assembly is assembled.

FIG. 2b is a perspective view of the articulated boom assembly showing how the articulated boom is assembled. The articulated boom assembly 16 is made in two sections in which the primary section 48 is 8 to 10 feet long and the secondary section 50 is 8 to 10 feet long. Preferably, each section of the boom is powder coated with a heavy plastic insulation to protect against accidental shorting of the welding wire. The primary section 48 is mounted to a vertical surface capable of carrying the load. A boom mounting plate 52 is attached to a mounting surface 54 with four bolts. The mounting plate 52 has trimming adjustments to keep the boom level. Adjustable drag brakes have been designed into each pivot point 44 and 46 so the operator can adjust the force require to position the boom 16.

An insulated plate 56 is located on either side of the boom 16 at the mounting surface 54 end. This plate 56 contains a series of U-groove roller guides 58 which provide a path for the welding wire to follow as it is pulled from the welding wire drums to the top of the weld boom. These roller-guides 60 allow a welding wire to be pulled around a curve with a minimum of force. The roller-guide assembly is electrically isolated from the boom for extra protection against shorting.

A plurality of fiberglass troughs 62a, 62b, and 62c are mounted on the bottom of the boom 16 to provide a path for the cable and water assemblies 40 which include power cables, control cables, water hoses, and air hoses. The cable and water assemblies 40 enter the trough at the boom mounting surface 54 and leave at the wire feeder 20 to attach to the modular fixture component system 12.

A round pipe 64 with a 90-degree bend is mounted on the outer end of the boom 16. The horizontal section of this pipe has a pneumatic cylinder 66 inside. A cable 67 is attached to a cylinder arm 68, and travels from the end of the pneumatic cylinder arm 68, over a pulley 70, and down to the modular fixture component system 12. Air pressure is supplied to the pneumatic cylinder until the pressure equals the weight of the modular fixture component system 12 and the fixture is in balance. The welding operator can raise and lower the modular fixture component system 12 with a minimum of effort.

Figure 3A:
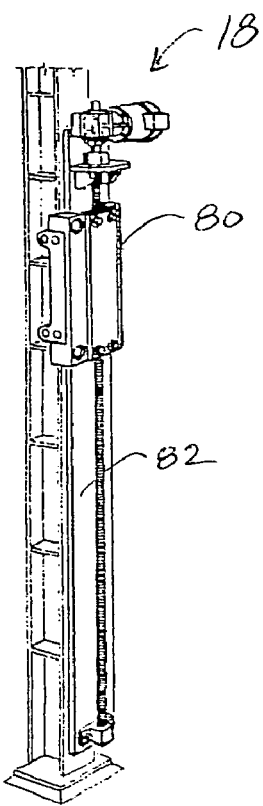
FIG. 3a is a perspective view of the articulated boom lift.

The welding fixture is capable of making welds requiring up to 2000 Amps. This high amperage requires six 4/0 cables. A tall weld requires walking or leapfrogging the copper shoes up the weld. Four shoes need four water input water hoses and four output hoses. The articulated boom assembly 16 is designed to allow the welding operator to quickly move from one weld to the next without having the drag these heavy cables all over the place FIG. 3a is a perspective view of the articulated boom lift 18. Referring to FIG. 3a and FIG. 2a, the articulated boom lift 18 is designed to adjust the position of the articulated boom 16 to the optimal position for welding structures of varying height. Additionally, the articulated boom lift 18 makes it easier for the welding operator to position the boom at floor level for reloading wire into the wire straightener 22, wire feeder 20 and wire feed conduits. The articulated boom lift 18 includes a vertical carriage 80 and a carriage track plate 82.

Figure 3B:
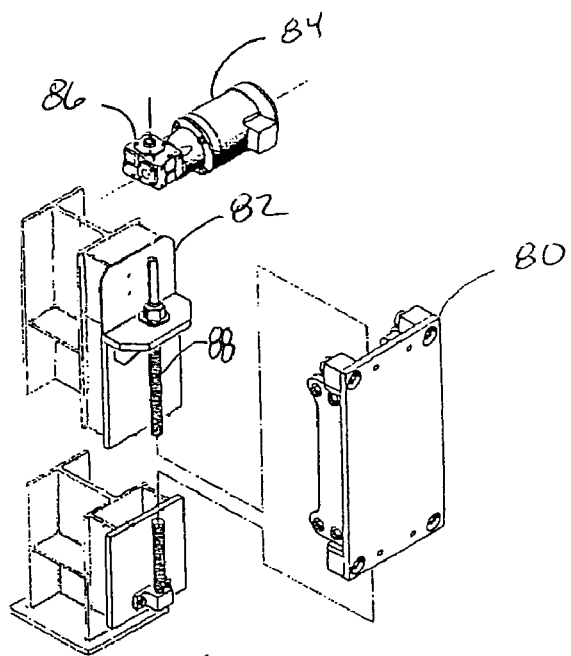
FIG. 3b is a view of the top and bottom of the articulated boom lift and provides a more detailed view of the vertical carriage and the carriage track plate.

FIG. 3b is a view of the top and bottom of the articulated boom lift 18 and provides a more detailed view of the vertical carriage 80 and the carriage track plate 82. An AC gear motor 84 having a gearbox 86 turns a long screw 88 which is fixedly coupled to the carriage track plate 82. Preferably the gearbox 86 has a ratio of 5:1, the long screw 88 pitch is 4-pitch, the AC gear motor is a 1 HP motor. Preferably, the vertical carriage 80 travels at a speed of approximately 6 to 7 feet per minute and has a lifting capacity of approximately 2000 pounds.

Figure 3C:
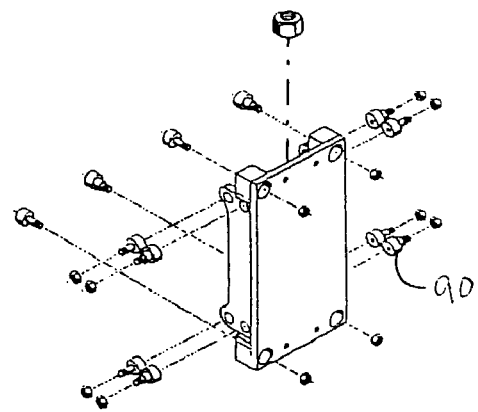
FIG. 3c is a perspective view of the vertical carriage.

FIG. 3c is a perspective view of the vertical carriage 80. Preferably, the vertical carriage 80 has plurality of cam followers bearings 90 which ride on the vertical carriage 80. Preferably each cam follower bearing 90 has a load capacity of 10,000 pounds.

FIG. 4a is a perspective view of wire feeder 20. Preferably, the wire feeder 20 comprises a variable motor 100 such as a ½ HP 2500 RPM variable motor. A gear reducer 102 has a 30:1 reduction which produces a wire feed speed range from 0-450 inches per minute (IPM). In its preferred embodiment, the welding process uses a multi-wire process, and the feeder is capable of feeding four wires with diameters from 0.035" to ³⁄₁₆" through couplings 104a, 104b, 104c, and 104d. The gearbox 102 includes a hollow-shaft reducer which allows the user to replace the shaft if it becomes damaged.

Prior art wire feeders which have the capacity of feeding two wires at the same time use a single pressure roll to force the plurality of wires into a double v-groove drive roll. As more pressure is applied, a greater load is transferred to the gearbox and the drive motor which can cause the drive motor to overheat. If too much pressure is applied, the shaft will deflect, resulting in unequal pressure applied to the two wires. Unequal pressure can cause the two wires to feed at different rates, making the welding condition unstable, resulting in a weld defect.

FIG. 4b is a perspective view showing the assembly of wire feeder 20. A shaft 106 which extends beyond the width of the gear reducer 102 is configured to receive a plurality of drive rolls. Each of the plurality of drive rolls includes two serrated V-groove drive roll 108a and 108b joined by a steel keyway 110. The two serrated V-groove drive rolls 108a and 108b are configured to receive a welding wire. A pressure roll arm 112 applies a downward pressure to the serrated V-groove drive rolls 108a and 108b. A more detailed view of the shaft encoder 120 and the roll arm 112 is shown in FIG. 4d. An idler roll arm 114 applies an upward pressure to the serrated V-groove drive rolls 108a and 108b. A spring 116 is used to apply pressure to both the roll arm 112 and the idler roll arm 114.

FIG. 4c shows how forces are applied to the welding wire in the wire feeder. Referring to FIG. 4c as well as FIG. 4b, there is shown that as the shaft 106 turns, the spring 116 applies a downward pressure to the roll arm 112 and wire 118 and an upward pressure to the idler roll arm 114, thereby overcoming the prior art limitation of unequal pressure applied to the drive rollers. Preferably, the wire feeder includes four sets of drive rolls, pressure roll arms, idler roll arms, and springs as shown in FIG. 4a and FIG. 4b.

Referring back to FIG. 4b, it shall be appreciated by those skilled in the art having the benefit of this disclosure that if the wire feed rate is zero, the combination of drive rolls 108a and 108b may continue to turn due to the motor 100 even if no wire is being fed. However, idler roll attached to the roll arm 112 only moves when the welding wire 118 feed rate is greater than zero. The idler roll is only turned by the motion of the welding wire, not the motion of the drive roll. In this way, the speed of the wire is measured, not the speed of the drive roll.

Therefore, the wire feed speed is more accurately measured by monitoring the revolutions of the roll arm 112 with a shaft encoder 120 situated up against the outer race of the roll arm 112 than by measuring the drive rolls revolutions. If the welding wire should slip on the drive rolls, the control system can accommodate for the slippage by feeding more power to the motor 100 and simultaneously turn off the wire straightener 22 to prevent breakage of the welding wire.

Figure 5A:
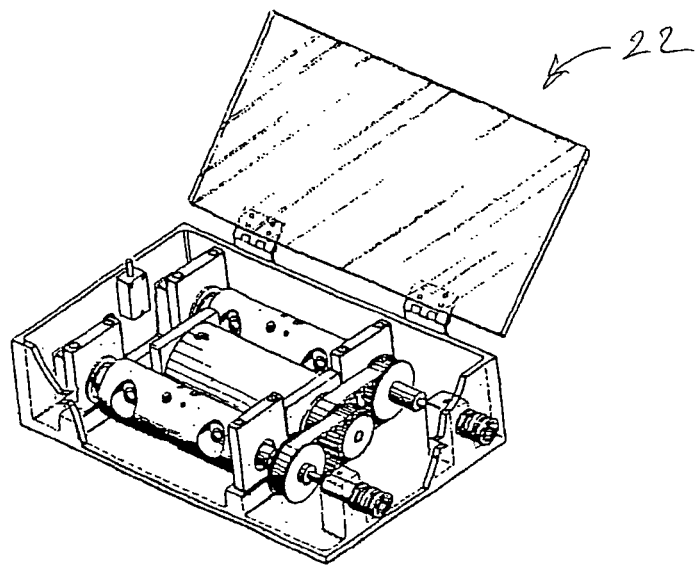
FIG. 5a is a perspective view of the wire straightener.

FIG. 5a is a perspective view of the wire straightener 22. The wire straightener 22 removes cast and helix from both the solid and metal cored wires. Preferably, each wire straightener handles two wires up to ⅛ inch in diameter. It shall be appreciated by those skilled in the art that straight wire is critical element of performing a high quality weld.

By way of example, if wire casts toward one edge of a weld puddle, a temperature gradient may be generated in the weld puddle which would result in incomplete fusion on one of the joint edges. Additionally, unequal base metal dilution can become so severe that it can lower toughness in the heat affected zone (HAZ) of the plate with the higher dilution.

Figure 5B:
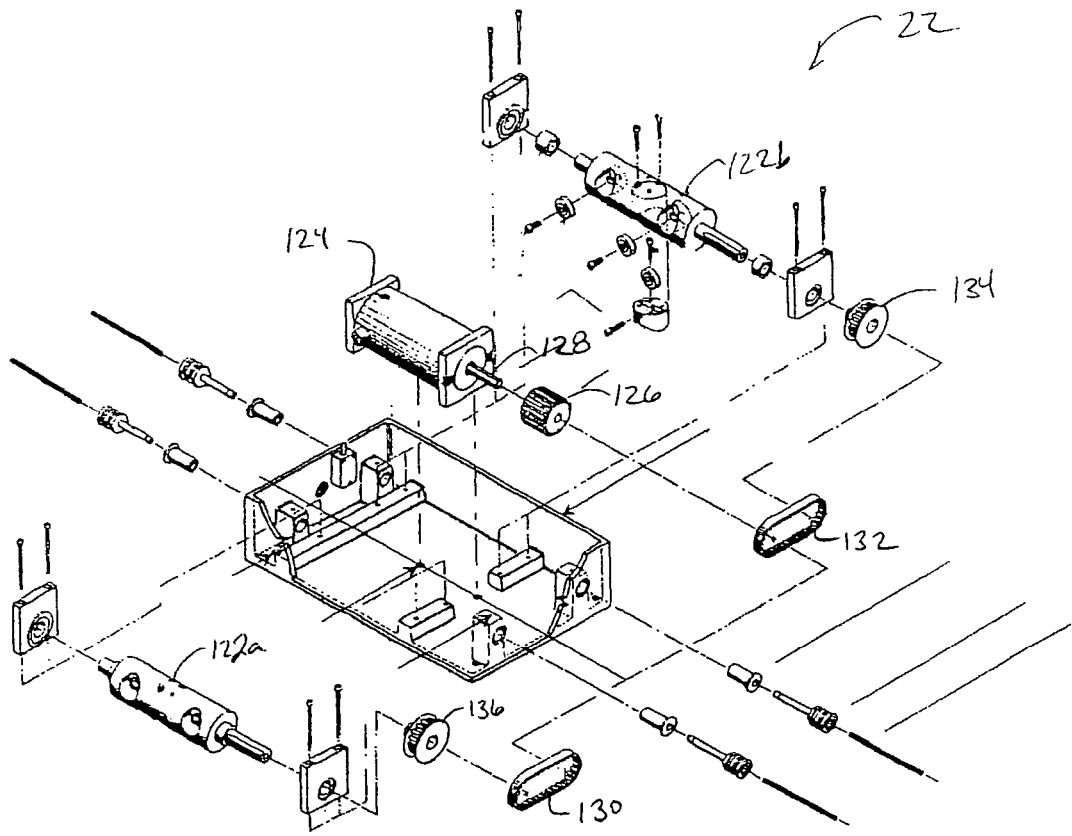
FIG. 5b is a perspective view showing the assembly of the wire straightener.

FIG. 5b is a perspective view of the assembly of the wire straightener 22. It shall be appreciated by those skilled in the art that a welding operation requiring four wires uses two wire straighteners 22. However, for illustrative purposes the assembly of one wire straightener is herein provided. Preferably, the two rotors 122a and 122b which straighten wires are driven by a ¼ HP, variable speed, DC motor 124, located between the rotors. The DC motor 124 has a double length gear-belt pulley 126 attached to a motor output shaft 128. A first gear belt 130 and second gear belt 132 are each coupled to the gear-belt pulley 126. The first gear belt 132 drives the right rotor 134 and the second gear belt 130 drives the left rotor 136.

Welding wire is pulled from a drum through rotors 122a and 122b of the wire straightener 22. The welding wire which passes through each rotor has both cast and helix. Helix in the wire continually changes the cast direction with regard to the rotor. In operation each rotor continually rotates around the wire and it counter-bends the cast, no matter which direction helix in the wire places the cast. In this way, each rotor removes both cast and helix from the wire.

The wire straightener motor 124 receives speed commands from a 90 VDC motor control module which is described in further detail below. The speed of the wire straightener motor 134 is determined by the speed of the wire feed motor 100 of FIG. 4a which is also controlled by the 90 VDC motor control module. As the wire feed motor 100 speeds up, the straightener motor 124 speeds up and conversely as the wire feed motor 100 slows down, the wire straightener motor 124 also slows down.

In operation, the welding wire is threaded through each rotor 122a and 122b. Each rotor has three U-groove bearings-one on either end, and one in the center (not shown). All three bearings are in line and allow the welding wire to pass through the center of each rotor 122a and 122b. To straighten the wire, the center bearing must be adjusted out of line with the end bearings. In this way each time the rotor turns; the out-of-line center bearing bumps the welding wire as it passes through the rotor. Each bump counter bends the cast of the wire and straightens it, one bump at a time. A more detailed description of the wire straightener 22 is provided in patent application Ser. No. 09/058,741 which is hereby incorporated by reference.

Preferably, the wire straightener motor 124 turns each rotor 122a and 122b at speeds from 0 to 1750 RPM which depends on the feed rate of the welding wire. As the wire feeder 20 pulls wire through each rotor 122a and 122b, the welding wire is straightened one bump at a time. The speed of each rotor is programmed to match the wire feed speed. By way of example and not of limitation, if the wire is bumped every ⅛ inch at low wire feed speeds, it will also be bumped every ⅛ inch at high feed speeds.

Figure 6A:
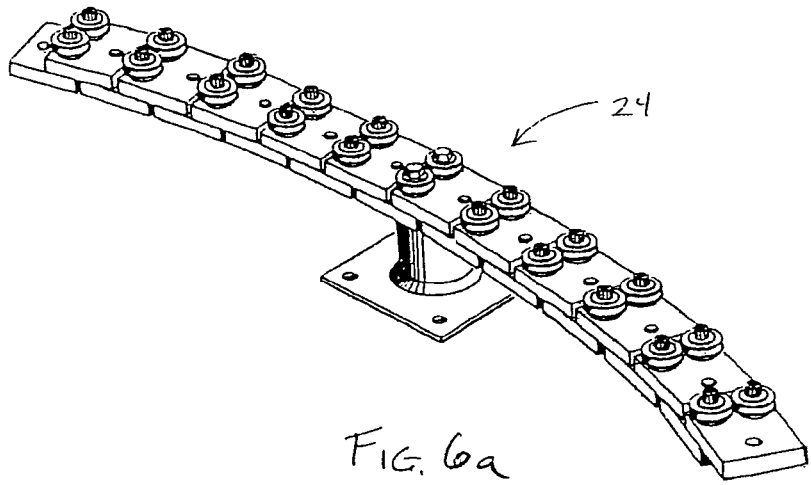
FIG. 6a is a perspective view of the articulated wire guide.

FIG. 6a is a perspective view of the articulated wire guide 24. The articulated wire guide 24 prevents the problems associated with pulling wire around sharp bends or curves. The articulated wire guide 24 is designed like links in a chain wherein each link is identical to the next. The links are designed so that each link may swivel +/−3 degrees or less. The total degree of link swivel determines the overall radius of the wire guide arc. By limiting the total degree of link swivel, the radius along which the welding wire is pulled can be limited. Depending on the application, links can be added and/or subtracted from the standard length of 11 links to generate the appropriate radius for the wire guide arc.

Figure 6B:
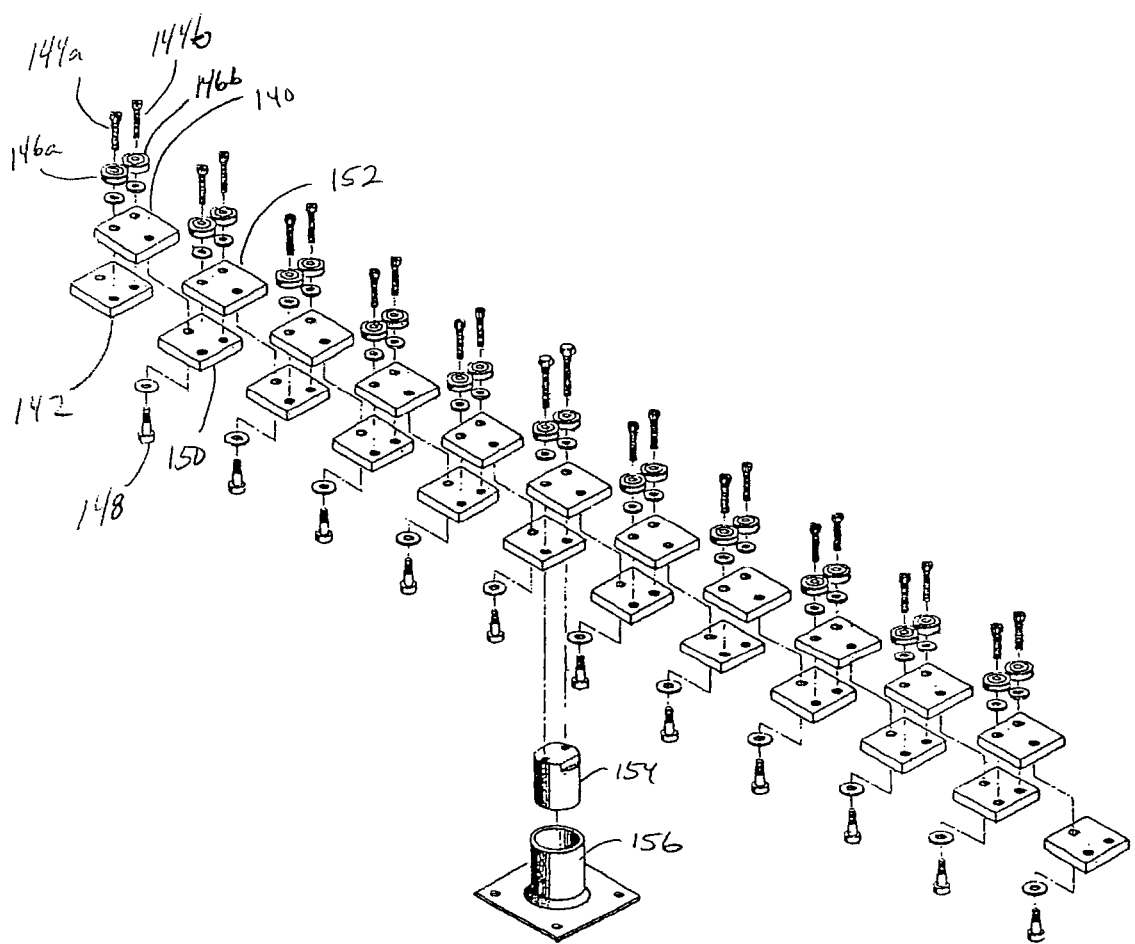
FIG. 6b is a view of the showing the assembly of the articulated wire guide.

FIG. 6b is a perspective view of the assembly of the articulated wire guide 24. The articulated wire guide 24 includes a plurality of fixed coupling segements which comprises a plurality of "links" in which each link includes a top U-groove roll plate 140 fixedly coupled to a first bottom shoulder plate 142 with two screws 144a and 144b. Each of the two screws 144a and 144b are also used to couple two U-groove bearings 146a and 146b, respectively, to the U-groove roll plate 140. Each of the U-groove bearings 146a and 146b are adjacent to one another such that a welding wire cavity is defined by the U-groove bearings 146a and 146b which receives a welding wire. The articulated wire guide 24 includes a plurality of movable coupling segments which include another screw 146 movably couples a second bottom shoulder 150 to the top U-groove roll plate 140, thereby allowing the swivel of +/−3 degrees or less. The second bottom shoulder plate 150 is fixedly coupled to a second top U-groove roll plate 152 using two screws as previously described. The second U-groove roll plate 152 is then movably coupled to the following bottom shoulder plate. The articulated wire guide 24 calls for a plurality of fixed coupling segments and movable coupling segments to generate the so called links in the articulated wire guide 24. The articulated wire guide 24 sits on a round swivel mounting post 154 which is fixedly coupled to a swivel mounting bracket 156 which insulated from and coupled to the articulated boom 16.

FIG. 7a is a perspective view of the stiffener fixture module. The stiffener welding fixture 14 reduces setup time for vertical welding. The fixture is designed to quickly locate the consumable guide tube in the center of weld, and at the same time, clamp the copper shoes on either side of the weld cavity.

FIG. 7b is a view showing the assembly of the stiffener welding fixture 14. An oscillator slide 160 is mounted in the center of the vertical upright bracket 162. The oscillator slide 160 provides oscillation control of the guide tube 161 in the y-axis and is described in further detail in FIG. 9. An oscillator control module 163 acts as a control module which powers and controls the oscillator slide 161. A manual slide 164 is mounted on the front of oscillation slide 160. The manual slide 164 provides control for placement of the guide tube 161 in the z-axis. A more detailed description of the manual slide 164 is provided in FIGS. 11a and 11b. A weld torch rotator 166 is mounted on the front of the manual slide 164 and provides fine tune rotational control of the guide tube 161 about the x-axis. A more detailed description of the weld torch rotator is provided in FIGS. 12a and 12b. The weld torch rotator 166 includes a pair of precision ground rods 168a and 168b which receive a weld torch 170. The weld torch 170 position is determined by sliding the weld torch 170 back and forth on the precision-ground rods 168a and 168b, thereby providing control along the x-axis for the placement of the guide tube 161. A more detailed description of the weld torch is provided in FIGS. 10a and 10b. The consumable guide tube 161 is mounted onto the bottom of the weld torch 170. A pair of weld shoes 172a and 172b are used to define a weld cavity. Each of the weld shoes 172a and 172b is mounted onto an aluminum arm 174a and 174b, respectively, and is driven by a right hand/left hand screw 176. When the operator turns the hand wheel of hand screw 176, the hand screw 176 causes the weld shoes 172a and 172b to move toward the center point of the fixture 14. When the weld shoes come in contact with a stiffener (not shown), the center of the consumable guide tube 161 is forced to the center of the weld cavity.

In operation, after the weld shoes 172a and 172b have come in contact with the stiffener (not shown), the operator tightens two clamping knobs 178a and 178b located on the front of the stiffener fixture 14. This action forces the weld shoes 172a and 172b against the inside surface of the flange plate (not shown). It also centers the consumable guide tube 161 in the weld gap. The guide tube 161 is now in position to start the weld.

By way of example, if the guide tube 161 is 1-inch wide and the stiffener is 1-inch wide then oscillation is not necessary. However, if the stiffener plate (not shown) is thicker than 1-inch, the operator can oscillate the guide tube 161 to spread the weld puddle to occupy the weld cavity. The oscillation action of the guide tube 161 allows the operator to weld stiffeners from 1 to 4 inches thick with the same guide tube 161 by increasing the width of oscillation to match the thickness of the stiffener.

Referring to FIG. 8 there is shown a perspective view of the weld shoes 172a and 172b. The weld shoes 172a and 172b are also referred to as tee weld shoes 172a and 172b. Preferably, the tee weld shoes are water-cooled copper welding shoes which keep the molten weld metal and flux bath contained in the weld cavity. Water circulates through the shoes at a flow rate of approximately 2 gallons per minute. This flow rate keeps the copper shoes from melting from excessive heat. In consumable-guide welding, the shoes do not move. For longer joints the shoes are repositioned in a leap frog manner, as welding continues upward.

Preferably, the tee weld shoes 172a and 172b are cast from pure copper. Each shoe is cast in a sand mold with an interior passage for water flow. A recess ⅛" deep by 1" wide is designed into the face of each shoe to shape the weld reinforcement. Chamfered edges are provided where the copper makes contact with the base material. These chamfered edges help the molten Meld metal to wet against the parent material to provide a smooth transition between the weld metal and the parent material. Each shoe has a ⅜" NPT threaded hole on the input and output for connecting water circulation hose couplings.

Two 1½" square mounting pads 180a and 180b are cast into the back surface of each tee weld shoe. Each of these mounting pads 180a and 180b have four threaded holes for mounting. The four holes form a 1" square pattern and are drilled and tapped for 10-24 screws. The tee weld shoe is provided in 9", 12" and 18" lengths. These lengths can be leapfrogged to make welds of various heights.

The tee weld shoes 172a and 172b are used in pairs on either side of the welding joint. When laced against the parent material, cooling water should always enter the copper shoes from the bottom and exit from the top. Water flowing from bottom to top reduces the possibility of vapor-lock which could stop the flow of water.

Preferably, the 9" long shoe is used with the stiffener fixture module 14. The square mounting pad 180a matches the mounting hole pattern on the fixture's movably aluminum arm 174a (see FIG. 7b). The tee weld shoes 172a and 172b can be positioned (mirror imaged) on either side of the weld joint, so that the relief groove is always toward the top of the Tee. After the tee weld shoes 172a and 17b have been attached to the stiffener fixture module 14, a radius can be grounded on the bottom of the tee weld shoe to match the radius of the rolled beam where the web of the beam meets the flange.

When the tee weld shoe 172a and 172b is used with the butt/tee welder fixture (which is described in further detail below), a steel bar is attached to the back of the shoe between the two mounting pads. This bar is necessary when using strong-backs and wedges to clamp the copper shoes against the weld joint. This bar helps eliminate damage to the shoe from the wedge, as it is forced between the shoe and the strong-back.

Figure 9A:
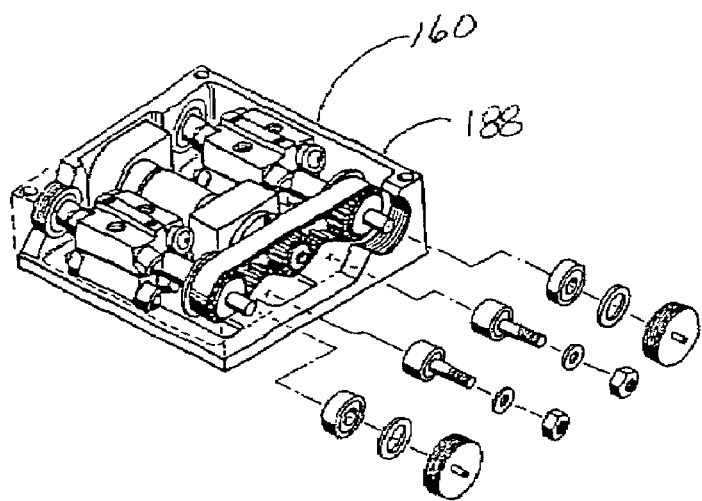
FIG. 9a is a perspective view of an oscillator slide.

Referring to FIG. 9a there is shown a perspective view of an oscillator slide 160 without the top cover. The oscillator slide 160 is a motorized box slide which is configured to carry a 10-lb load at the face and is designed to work in a dirty environment. All of the mechanical components are housed in a dust-proof box 188. Preferably, either a manual slide 164 or a torch rotator 166 is mounted on the faceplate 162 (see FIG. 7b).

Figure 9B:
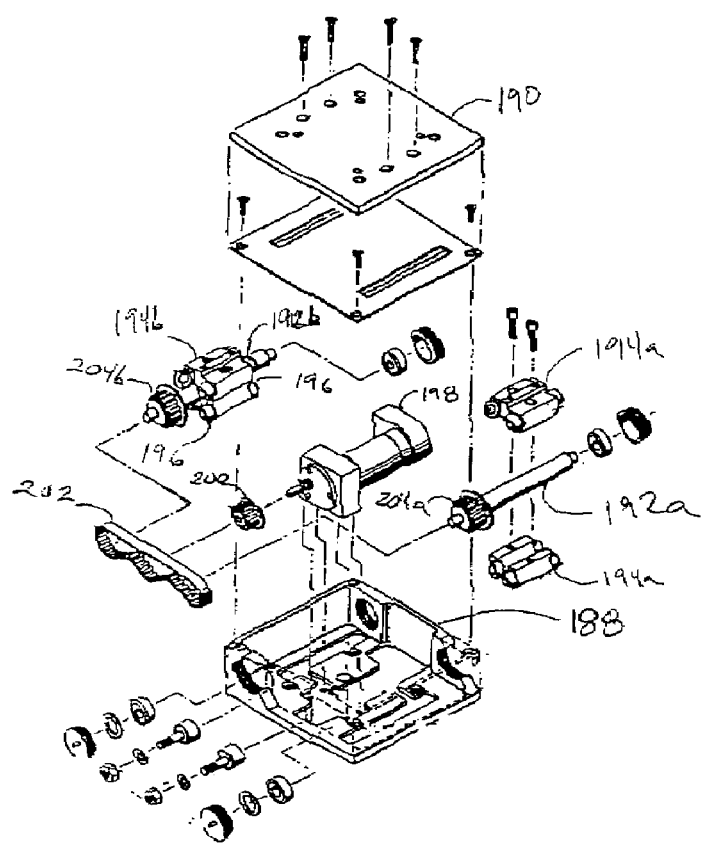
FIG. 9b is a perspective view which shows the assembly of the oscillator slide.

FIG. 9b is a perspective view which shows the assembly of the oscillator slide 160. Only a faceplate 190 moves during the oscillation cycle. Inside the dust-proof cast aluminum box 188 is a pair of precision ground parallel shafts 192a and 192b. Slidably mounted on each shaft 192a and 192b is a linear actuator slide block 194a and 194b, respectively. At each end of the linear actuator 194b is a group of four canted bearings 196 which propel the linear actuator 194b along the shaft 192b as the shaft 192b rotates. The canted bearings 196 are arranged so that they are 20 degrees to the tangent of the contact point for each bearing. The friction between the canted bearings 196 and the shaft 192b causes the linear actuator slide block 194b to move when the shaft 192b is turned, just as a nut is forced to move when a threaded shaft is turned. The linear actuator 192a operates in a similar manner as linear actuator 192b.

A drive motor 198 which is located between the two linear actuator slide blocks 194a and 194b and has a gear belt pulley 200 mounted on the end of the drive motor 198 drive shaft. When the motor gear belt pulley 200 turns, a gear belt 202 transmits motion to two gear belt pulleys 204a and 204b which are fixedly coupled to the precision ground drive shafts 192a and 192b, respectively. As the drive motor 198 drive shaft turns, the two linear actuator slide blocks 194a and 194b move in unison because they are both connected to the same gear belt 202. The direction in which the linear actuator slide blocks 194a and 194b travel is determined by the direction of the drive motor 198. The advantage of this design is that it allows the linear actuator slide blocks 194a and 194b to slip on the shaft 192a and 192b, respectively, if the welding torch 170 runs into an obstruction while a weld is in progress. Additionally, the hardened and ground drive shafts 192a and 192b reduces wear and allows the oscillator slide 160 to operate in a very dirty environment.

The faceplate 190 is attached to the top face of the two linear actuator slide block 194a and 194b. As the drive motor 198 cycles clockwise and counterclockwise, the face plate 190 oscillates back and forth. An encoder (not shown) is attached to the rear of the drive motor 198. An oscillator control module (not shown) commands the drive motor 198 to move, the encoder sends pulses back to the controller to count. There are a fixed number of pulses per linear inch of travel. The oscillator control module counts these pulses to keep track of slide position.

If the weld torch 170 of FIG. 7b runs into an obstruction, slippage between each of the canted bearings 196 contact points and the precision-ground shafts 192a and 192b could accumulate into an error for the controller. To correct for this potential error, a linear sensing device is attached to the bottom of one of the linear actuators (not shown). If a slip occurs, the error is detected by comparing the motor encoder position (where the slide should be) with the linear sensing device (where the slide actually is).

It shall also be appreciated by those skilled in the art having the benefit of this disclosure that the size of the oscillator slide 160 can be varied to carry greater loads or smaller loads. To minimize the weight of the modular fixture component system 12, the size and weight of the oscillator slide 160 should also be minimized.

For a more detailed description of the oscillator slide 160 please see patent application Ser. No. 09/058,741 which is hereby incorporated by reference.

Referring to FIG. 10a there is shown a perspective view of the stiffener fixture weld torch 170. In one embodiment, the weld torch 170 carries a two-wire consumable guide tube. Preferably, multiple wires are used instead of a single welding wire to generate a higher form factor which gives better mechanical properties to the weld.

Referring to FIG. 10b there is a perspective view of the weld torch showing how it is assembled. In operation, the weld torch 170 carries welding current of up to 1500 Amps from the power cables to the consumable guide tube 161. The weld torch 170 is operatively coupled to the oscillator slide 160, the manual slide 164 and the torch rotator 166, and may be oscillated during the welding process.

The welding torch has four main components: an input power block 210, a buss bar 212, an insulator plate 214, and a guide tube clamping plate 215. The input power block 210 contains two threaded holes to accept welding wires. The input power block 210 is fixedly coupled to the top of the buss bar 212 by four screws, and when the two pieces of copper are brought together, two holes form at the top of the joined sections to receive the welding wires from the wire feeder 20.

An insulator plate 214 is made of a phenolic material and is attached to the front of the welding torch. Two grooves are milled inside the front insulator. These two grooves provide a path for the spring liners to carry welding wire to the consumable guide tube 161. The insulator plate 214 also provides electrical insulation between the welding torch and the welding fixture. The insulator plate 214 has two holes 216a and 216b, one on either side, to provide forward and reverse adjustment for the weld torch 170. Two precision ground rods 168a and 168b (see FIG. 7b) are inserted into the two holes 216a and 216b. The ground rods 168a and 168b are mounted on the torch rotator 166 and provide a surface for the weld torch 170 to slip back and forth. When the weld torch 170 is in position, two locking screws 218a and 218b hold it securely in place.

At the bottom of the buss bar 212 is a slot for receiving the guide tube 161. The top of the guide tube is placed in this slot so that the two holes in the guide tube lineup with the holes defined by the buss bar 212 and the insulator plate 214. A straight wire path is provided from the conduits, down spring liners (not shown), and into the consumable guide tube 161. When the guide tube is in position, it is held in place by the guide tube clamping plate 215. Screws 220a and 220b are located on one side of the clamping plate 215 and provide sufficient pressure when tightened to hold the guide tube 161.

Preferably, the welding torch is designed to accept a standard consumable guide tube 161 which measure 1" wide and is to carry two 3/32" diameter metal cored wires at currents up to 1500 Amps. The welding torch 170 and guide tube 161 combination is the most economical for production welding and can be used to weld stiffeners from 1" to 4" thick.

FIG. 11a is a perspective view of a manual adjusting slide which is designed for the relatively lightweight stiffener welding fixture 14. The manual adjusting slide is designed to overcome limitations in the prior art. Prior art "V-weigh" slides are subject to clogging and jamming from flux particles and smoke generated during the welding process. Additionally, the V-weigh slides are difficult to adjust. To overcome these limitations, the manual adjusting slide 164 is designed to travel along weighs which eliminates clogging and jamming.

FIG. 11b is a perspective view showing the assembly of the manual adjusting slide 164. The manual adjusting slide 164 includes a six bearing slide block 229 which has three bearings on each side of the six bearing slide block 229. As shown in FIG. 11b, one side of manual adjusting slide has three bearings 230a, 230b and 230c. Although not shown, the other side has a similar configuration for the other three bearings. Each of the six bearings has a single contact point which rides on four hardened, ground and round weighs 232a, 232b, 232c, and 232d. Two of the weighs 232b and 232d are place in the bottom along the longitudinal seams of box 234. The six bearing slide block 229 is placed on top of the two weighs 232b and 232d. An adjusting screw 236 is threaded into the slide block 229 using a nut 238 located within a cavity defined by slide block 229, wherein the cavity, is in the center of slide block 229. Two additional weighs 232a and 232c are placed in the top of the top two longitudinal seams in box 234. The slide weighs 232a, 232b, 232c and 232d are further protected by a sheet metal dust cover. When the slide block 229 moves back and forth, two stainless steel bands 238a and 238b help seal the interior components of the slide from outside contamination. Five setscrews 240 located on the side of the box 234 are used to adjust the weighs 232a, 232b, 232c, and 232d are used to eliminate any slop. Slop is generally defined as any right/left play in a screw/nut system. Backlash is eliminated by the use of a lead screw nut 238, such as manufactured by Delrin-AF, located in the center of the slide block 229. Backlash is generally defined as any forward/backward play in a screw/nut system.

Figure 12A:
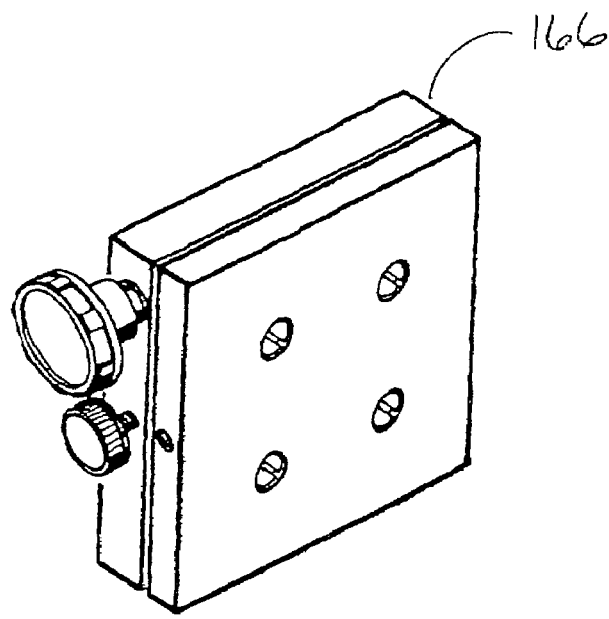
FIG. 12a is a perspective view of a weld torch rotator.

FIG. 12a is a perspective view of the weld torch rotator 166. Referring to FIG. 12a and FIG. 7b, the torch rotator 166 is used to align the guide tube 161 within the sides of the weld joint to prevent the guide tube 161 from shorting against the welding shoes 172a and 172b. The torch rotator is small, lightweight, yet rugged and durable.

Figure 12B:
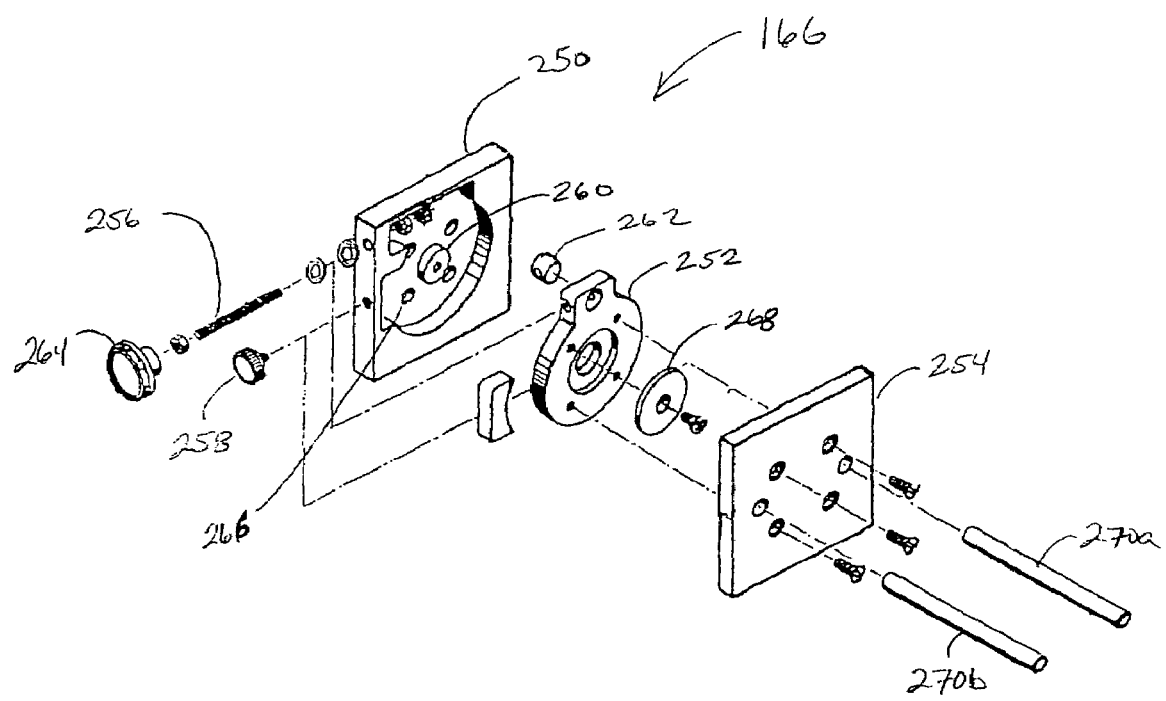
FIG. 12b is a perspective view of the assembly of the weld torch rotator.

FIG. 12b shows a perspective view of the torch rotator 166 having three main components which include a back mounting plate 250, a rotating plate 252, and a front mounting plate 254. A rotator adjusting screw 256 and a friction adjustment screw 258 are located on the back mounting plate 250.

The plastic rotating plate 252 rotates around an aluminum shaft 260 machined into the back mounting plate 254. A round piece of brass rod 262 is slipped into a hole at the top of the rotating plate 252. The side of the brass bar is stock is drilled and tapped to accept the adjusting screw 256. A clamping knob 264 is attached to the end of the adjusting screw 256. When the clamping knob 264 turns the screw 256, the threaded brass rod 262 is either pulled or pushed to move the rotating plate 252. This configuration provides the operator with a fine rotating adjustment for the consumable guide tube 161.

The back mounting plate 254 may be attached to any mounting surface by four flat-head screws, placed through counter-sunk holes 266 in the back mounting plate 254. After the back mounting plate has been attached to a mounting surface, the plastic rotator plate is placed into the back mounting plate and held in position by a washer 268. The front mounting plate 254 is then attached to the rotator plate 252 with four flat-head screws. The welding torch 170 is then attached to the front mounting plate 254 with the rods 270a and 270b. When completely assembled, the operator simply turns the adjusting screw 256 to rotate the front mounting plate 254 and the weld torch 170.

FIG. 13a shows the perspective view of a consumable guide tube used with stiffener weld shoes 172a and 172b. The guide tube is manufactured with one, two, three or four grooves and FIG. 13a is of two wire guide tube. A single groove guide tube is used when welding with one wire. A two-grooved guide tube is used when welding with two wires, and so on. Each wire guide tubes can be manufactured with a variety of widths to the match the plate thickness being welded.

Button insulators 280 are attached to either side to the flat surface of the guide tube. These button insulators are glued on to the surface of the guide tube 161 with a high temperature alumina based glue. The button insulators 280 are made from a flux which is used in the electroslag welding process. The button insulators 280 are attached to the guide tube 161 every 4 to 6 inches. When conducting an electroslag weld, the molten flux puddle reaches the glued-on button insulator and the insulator melts and becomes part of the molten flux puddle. The buttons are small enough that they cause no significant change to the resistance, chemistry, or depth of the weld puddle.

FIG. 13b is side view of a variety guide tubes. Each of the consumable guide tubes in FIG. 13b is made from two separate strips of steel in which the first strip 282 has at least one groove and the second strip 284 is flat. The two strips are made from steel which have less than 0.10 Carbon and 0.10 Aluminum in the chemistry of the steel. The two strips 282 and 284 are then spot welded together to make the consumable guide tube 161. When the flat strip is placed on top of the grooved strip a 1/8 diameter hole is formed to provide sufficient clearance for a 3/32" diameter welding wire to feed down the groove.

Preferably, each of the strips 282 and 284 is between 22-guage and 10-guage in thickness. When welded together they form a guide tube that is combined thickness of the two strips. Referring also to FIG. 13a, the button insulators 280 are approximately 1/4" thick and are attached to either side of the guide tube 161 producing a guide tube thickness of 5/8" thick. For a narrow gap electroslag weld, this results in a 1/8" clearance when placed inside the 3/4" wide narrow gap weld cavity. This clearance allows the guide tube to be oscillated to perform the weld. If the weld process requires that the guide tube be fixed in one position, rolled aluminum strips can be wedged on either side of the guide tube to eliminate the 1/8" clearance.

FIG. 13c is a perspective view of a guide tube using the butt/tee welding shoes which are described in further detail below.

FIG. 14a is a perspective view of a flux dispenser. The flux dispenser 290 is used if the welding system 5 is used for an electroslag process (see FIG. 1). The application of the electroslag process which uses a consumable guide tube requires that initial quantities of flux be added to the weld prior to activating cycle start. After cycle start has been initiated, flux must be slowly added until the flux puddle reaches a depth of approximately 0.50" to 1.5". It shall be appreciated by those skilled in the art having the benefit of this disclosure that if steel backup shoes are used, very little flux addition is required to finish the electroslag weld. However, if water-cooled copper shoes are used, a certain amount of flux plates against the face of the copper during the electroslag process. This flux must continually be replaced as the weld progresses upward, so that a constant flux depth is maintained.

The flux dispenser 290 can be programmed by the operator control panel 26 to provide flux, as needed, for the entire welding operation. The flux dispenser program section in the control module has variables that can be filled-in so that the correct amount of flux is added at the proper time during the run of the weld. The operator must enter the width of the plate and the width of the gap between the two plates into the control module. This information is necessary for the control module to calculate how much flux must be dumped prior to welding. After the arc is struck, an additional amount of preprogrammed flux will be added until the arc goes out and the weld enters electroslag mode.

In operation, the flux from the flux dispenser 290 becomes a molten resistor that floats on top of the molten weld metal. During the welding operation, if the flux becomes too shallow, the welding power supply will become more unstable and experience greater swings in amperage and voltage. The amperage and voltage sensors will sense these swings and turn the flux dispenser on, to add flux until the amperage and voltage swings settle down to acceptable limits. This action occurs for the entire weld.

Controlling flux depth is very important to the stability of the electroslag process. If the flux puddle is too shallow, welding current becomes unstable and penetration into the parent metal decreases. This condition can cause a lack of penetration to the parent metal, or flux inclusions in the weld metal. If the flux is too deep, amperage decreases, and the flux puddle becomes colder. This can result in a lack of penetration into the parent metal, and flux inclusions on the outer edges of the weld joint.

Referring to FIG. 14b there is shown a perspective view for the assembly of the flux dispenser 290. The flux dispenser is designed with drop-tubes 292a and 292b. Electrically insulated tubes (not shown) are fixedly coupled to each of the drop tubes 292a and 292b so that flux can be dropped on either side of the consumable guide tube 161. Each of the drop tubes 292a and 292b are coupled to a main mounting block 294. The main mounting block 294 is configured to receive a gearbelt pulley 296 and a small drive motor 298. The mounting block 294 also has an orifice 300 which receives flux from a beveled plate flux hopper 302. The beveled plate flux hopper 302 is confined by a second flux hopper 304 which is preferably a plastic Lexan flux hopper.

In operation, as the consumable guide tube 161 oscillates to one side, the motor 298 dispenses flux on the side opposite the guide tube 161. Controlled flux addition eliminates the possibility of chilling the molten flux bath.

Figure 15:
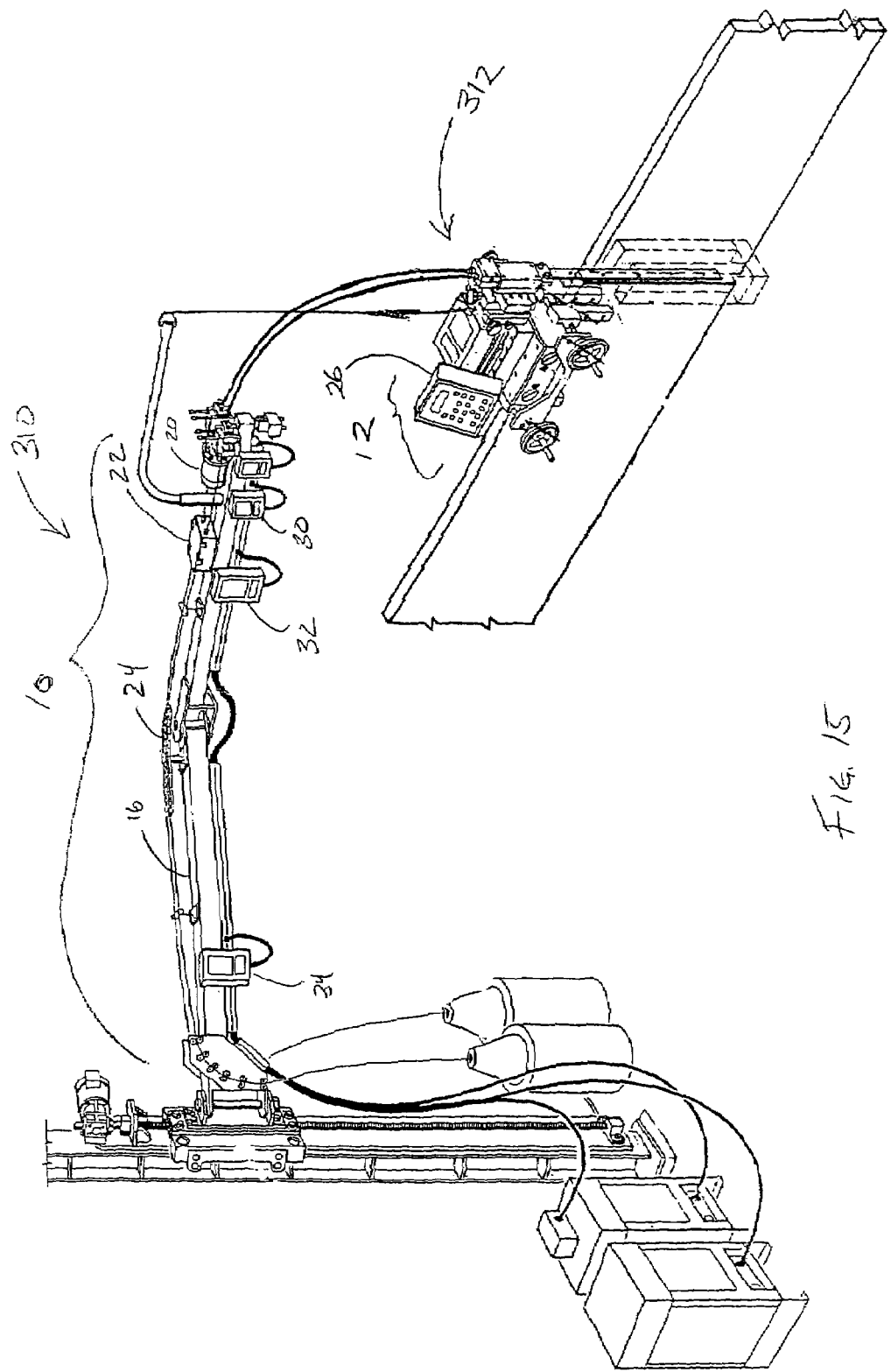
FIG. 15 is a perspective view of a modular welding system having a butt/tee welding fixture.

FIG. 15 is a perspective view of a modular fixture component system having a butt/tee welding fixture frame. The welding system 310 includes a basic component system 10 and a modular fixture component system 12 which is a butt/tee welding fixture 312. The basic component system 10 is the same as shown in FIG. 1 and includes an articulated boom assembly 16, an articulated boom lift 18, a wire feeder 20, a motorized wire straightener 22, an articulated wire guide 24, a water circulator (not shown), six 4/0 welding power cable assemblies, control cable assemblies, water hose assemblies, air hose assemblies; and an operator's control module 26, a wire feed control module 30, a dual wire straightener control module 32, and a welding power supply control module 34, which have all been previously described.

The modular fixture component system 12 is a butt/tee welding fixture 312 is described in further detail in FIGS. 16a and 16b. The butt/tee welding fixture 312 includes a butt/tee fixture frame, a motorized oscillator slide, an oscillator motor control module, a manual horizontal (forward/reverse) position trim slide, a vertical (up/down) position trim slide, a holding arm for a weld torch assembly, a welding torch rotator, a plurality of welding shoes, a stiffener welding torch, and a plurality of wire feed conduits which are described in further detail below.

FIG. 16a is a perspective view of the butt/tee fixture module. The butt/tee fixture module reduces set-up time and increases control over the welding process. The butt/tee fixture module is designed to quickly locate the consumable guide tube in the center of the weld cavity. The system can use one to four welding wires at the same time, and provides for guide tube oscillation for large welds.

FIG. 16b is a view showing the assembly of the butt/tee fixture module 312. A heavy-duty oscillator slide 314 is mounted on the center of the fixture's aluminum casing 316 to provide control of the guide tube 317. The heavy oscillator slide 314 is similar to the oscillator slide 160 with the exception that the heavy-duty oscillator slide 314 is larger, preferably 8×8 than the oscillator slide 160, which is smaller, preferably 5×5. A heavy duty manual slide 318 is mounted directly on top of the oscillator slide 314. The heavy duty manual slide 318 provides control in the x-axis of the guide tube 317 and also allows a welding torch 320 to be trimmed in the forward and reverse directions. The welding oscillator center-line adjustment is used for right and left welding torch trim. A more detailed description of the heavy duty manual slide is provided below. An "L-bracket" casting 322 is mounted on top of the manual slide 318 and provides a horizontal mounting surface for an oscillator module 323 which is a control module which powers and controls the oscillator slide 314. Additionally, the L-shaped bracket provides a vertical mounting surface for the torch rotator 324, the vertical manual slide 326 and horizontal manual slide 328. The torch rotator 324 provides the fine tune rotational control of the guide tube 317 about the x-axis. The vertical manual slide 326 is coupled to the torch rotator 324 and provides control of the guide tube along the z-axis. A horizontal manual slide 328 is coupled to the vertical manual slide 326 and provides for control of the guide tube along the y-axis. The horizontal manual slide 328 and vertical manual slide 326, are similar to the manual slide 164 in FIGS. 11a and 11b. The welding torch 320 is mounted on the front of the horizontal manual slide 328. A more detailed description of the welding torch 320 is provided below.

The weld torch 320 can receive one or more wires from the wire feeder 20. The weld torch 320 is also designed to accept a one wire or a multi-wire consumable guide tube 317. Using oscillation, a two-wire guide tube system can weld plate up to 4 inches thick. A four-wire torch can accept up to four wires from the wire feeder 20, and can accommodate one to four-wire guide tubes. A four-wire guide tube can weld plates up to 12 inches thick when used with oscillation.

The butt/tee welding fixture 312 is designed to hold both butt weld joints and tee weld joints. The butt/tee welding fixture 312 can be quickly clamped onto any plate for welding with a clamping assembly. The clamping assembly comprises a front clamping device 330a and a back clamping device 330b. Each clamping device 330a and 330b is controlled by a lead screw hand wheel 332a and 332b, respectively, which is also part of the clamping assembly. The clamping assembly centers the consumable guide tube by symmetrically clamping the butt/tee weld fixture 312 about the center of the weld.

The dual-wire guide tube is between 1-inch and 1¼ inch wide. If the butt weld or tee-weld guide tube is much wider than 1-inch/1¼ inch then the operator cant oscillate the guide tube to spread the weld puddle. The oscillation action of the guide tube allows the operator to weld plates up to 4 inches thick with the 1-inch/1¼ inch wide guide tube. This is accomplished by increasing the width of the oscillation to match the plate thickness.

FIG. 17 is a perspective view of the water-cooled butt-weld shoes. The butt weld shoes 340a and 340b are similar to the tee weld shoes which have been described previously. The butt weld shoes include two relief grooves 342a and 342b which are cast into the back face of each shoe. These relief grooves 342a and 342b are used to capture a stainless channel that can be attached to the back of the shoe to reduce wear caused by wedges forced against the back of the shoe. The butt-weld shoe is provided in a plurality of forms and lengths.

The butt-weld shoes are used in pairs on either side of the welding joint. When placed against the parent material, cooling water should always enter the copper shoe from the bottom and exit from the top. Water flowing form the bottom to the top reduces the possibility of vapor lock which could stop the flow of water.

Referring to FIG. 18a there is shown the butt/tee weld torch 320 configured to carry two weld wires. The butt/tee weld torch 320 design is similar to the stiffener weld torch 170. However, the butt/tee weld torch 320 does not have locking screws 218a and 218b (see FIG. 10b). Referring to FIG. 18b which is a view showing the assembly of the butt/tee weld torch 320, an additional difference is noted. Namely, an additional insulator plate is fixedly coupled to the buss bar 342, and movably coupled to the (up/down) manual slide 328.

Referring to FIG. 19a there is shown a perspective view of the heavy duty manual slide 318. The heavy duty manual slide 318 is capable of carrying greater loads than the manual slide 164 in FIGS. 11a and 11b.

FIG. 19b is a perspective view of the heavy duty manual slide 318. The heavy duty manual slide includes a slide block 350 which rides on eight cam is follower bearings 352 wherein a pair of cam follower bearings are disposed on each corner of the slide block 350 such that the pair of cam followers are occupy the top and bottom of each corner of the slide block 350. Each of these eight cam follower bearings 352 have one associated contact point that rides on weighs 354a and 354b. Each of the eight cam follower bearings 352 is disposed at an angle to the side block 350 side walls and are not orthogonal to the side block 350 side walls. The weighs 354a and 354b are further protected from dust and flux with sheet metal dust covers 356a and 356b. A dust cover 358 has two slots machined into the dust cover. The two slots receive two risers 360a and 360b. When the slide block 350 slides back and forth, the sheet metal dust cover 356a and 356b seal the slots and protect the components within the slide 318 from contamination.

The weighs 354a and 354b are placed in box 361 which has two longitudinal slots machined into the sidewalls of the box 361 for receiving the weighs 354a and 354b. The eight bearing slide block 350 is placed between the weighs 354a and 354b. An adjusting screw is threaded into a nut 364 which is located in the center of the slide block 350. Preferably, the nut 364 is a Delrin-AF lubricated plastic nut. Five set screws 364 are located on the side of box 361 and are used to adjust the weighs 354a and 354b to eliminate slop from the manual slide. Backlash is eliminated by using the nut 364.

Figure 20:
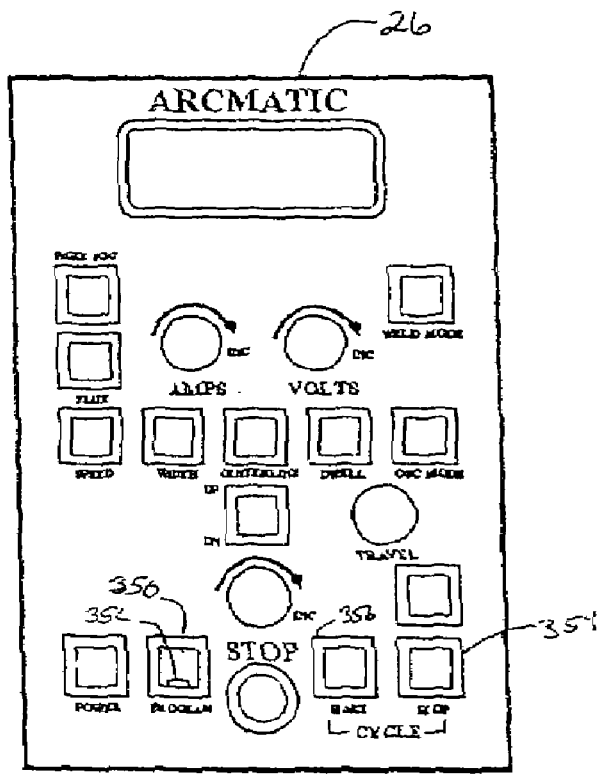
FIG. 20 is the face of the operator's control panel.

FIG. 20 presents the face of the operator's control panel 26. The operator's control panel 26 is the central interface for the modular control system. Additionally, the control panel 26 provides a simplified method of programming a welding process such as electroslag or an electrogas welding process.

To enter a welding program into the control panel 26, the operator enters the appropriate button to enter a program variable. The operator then toggles through six program screens and fills in the blank spaces by activating the appropriate knob, toggle, rocker or button. By way of example and not of limitation, when setting a value for amperage, the operator uses an amperage control knob. When setting voltage, the operator uses the voltage control knob. When all the blanks for each "screen" have been filled, the welding program is complete.

In operation, each module continually communicates with the operator's control panel 26. In this way the operator's control module 26 carries out the program entered into it by the welding operator. To enter a welding program, the welding operator must first press the "program button" 350. A portion 352 of the program button 350 is subsequently lit indicating that the control panel is in program mode. The operator then uses the "cycle stop" button 354 to advance forward to the next screen. He uses the "cycle start" button 356 to advance backwards to the past program-input screen. When he arrives at each screen, he uses the appropriate knob or button to input program variables into each one of the blank spaces in the program screen. When he has filled in all six screens he presses the program button 350 which becomes unlit indicating that the panel is out of program mode and into welding mode, and therefore ready for the welding process to begin. A more detailed description of the operator's control panel is provided in patent application Ser. No. 09/058,741 which is hereby incorporated by reference.

Figure 21:
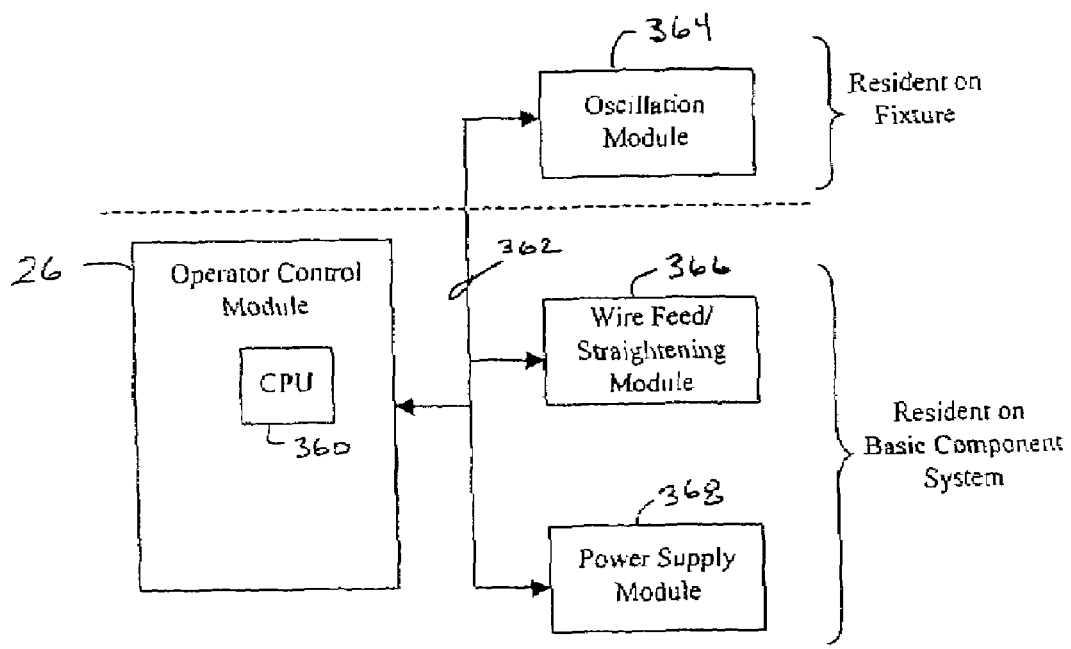
FIG. 21 is a high level block diagram of the modules which communicate with the operator's control panel.

FIG. 21 shows a high level block diagram of the "modules" which communicate with the operator's control panel 26. The welding program is processed by a CPU 360 resident on the operator's control panel 26. The CPU then transfers the information to a 6-wire bus 362 which communicates with an oscillation module 364, a wire feed/straightening module 366 and a power supply module 368. It shall be appreciated by those skilled in the art having the benefit of this disclosure that the 6-wire bus 362 carries the information previously requiring 150 wires in an analog control system. Reducing the number of wires from 150 to 6, makes cabling and maintenance of the system much simpler.

The oscillation module 364 is a 24 VDC control module which powers the "oscillator units" that oscillated the welding torch back and forth during the welding operation. The oscillator centerline adjustment also positions the weld torch for the stiffener fixture module 14 or the butt/tee fixture 312. The oscillation module 364 is part of the modular fixture component system. The oscillation module 364 is similar to the oscillation control module 163 and oscillation control module 323 previously described in FIG. b and FIG. 16b, respectively. An optically isolated H-bridge (not shown) provides up to 10 amps of motor drive power at 24 volts, and uses a quadrature encoder to provide positioning control to an accuracy of (+/−) 0.005 inches. Velocity ranges from 0.5 inches per minute (IPM) to 50 IPM and is controlled to 0.1 IPM. Safety features include excessive-position error detection and thermal shutdown control, with automatic recovery capability. Other on-board I/O includes optically isolated inputs from an index position indicator and relays for control of flux feed or other external devices.

A more detailed description of the motor control module is provided in patent application Ser. No. 09/058,741 which is hereby incorporated by reference.

The wire feed/straightening module 366 is comprised of a 90 VDC control module which controls and powers the motors used for controlling wire straightening and wire feeding. An optically isolated H-bridge provides up to 10 amps of motor drive power at up to 130 volts and uses a quadrature encoder (not shown) to determine wire feed speed. Velocity ranges from 0.5 inches per minute (IPM) to a maximum determined by the type of wire feeder. Speed is controlled to 0.1 IPM. Safety features include the wire feed detection which allows the wire straightener to only run when all wires are being fed by the wire feed/straightening module 366. The 90 VDC motor control module also communicates with the operator control module panel at least once a second, otherwise it will cease motion. Other on-board I/O includes three optically isolated input and relay outputs for control of external devices.

In operation, the wire feed/straightening module 366 receives commands from the operator control panel 26 over the 6-wire bus 362. The oscillation module 364 provides local control of the wire feeder 20 based on the commands input into the operator control panel 26. These commands set wire feed speed in IPM and wire jog speed as a percent of motor output. The operator's control panel 26 does not directly control the wire staightener 22, rather it is controlled by the wire feed speed and the output of the wire feeder. The wire straightener 22 only runs when wire is fed in the forward directions. Running the wire feeder in the reverse direction can be performed for short lengths.

The wire feed/straightening module 366 uses a feed forward algorithm to control wire feed speed. This is because the controlled parameter is wire feed speed and no positioning logic is required. Wire feed speed is used as the control parameter, rather that the welding power supply current output (amps) because the current output depends on a number of variable including wire feed speed. This also reduces the load on the 90 VDC motor control module since it does not need to monitor network packets for data coming from the welding power supply.

Wire feed direction can be both forward and reverse, but during a welding cycle the direction is limited to the forward direction. When the welding control section of the operator control module 26 is in the manual mode the operator can jog the wire in either direction to position it for welding or for maintenance of the welding system. Wire jog velocity is stored as a separate value from wire feed speed and is based on a percentage of the motor driver output.

Shaft encoders 120 are attached to each one of the four wire feed drive rolls. See FIG. 4*b*. When the wire feed/straightening module 366 is used to control the motorized wire straightener 22, the module 366 accepts inputs from the shaft encoders 120. If one of the encoders 120 stops giving an output, the module 366 interprets this as wire stoppage and turns off the motorized wire straightener 22 to eliminate wire breakage until the problem is fixed and wire feed is resumed.

The power supply module 368 is a welding power control module which provides welding voltage control and feedback from the welding power supply 36. Outputs consist of a SPST relay and a digital to analog (DAC) converter. The DAC provides a 12 bit +/−12 V output supporting various control voltage requirements of different welding power supplies.

Voltage and current generated by the welding power supply 36 are communicated to the operator control panel 26 with the power supply module 368. The power supply module 368 also includes a water flow detection input. It shall be appreciated by those skilled in the art having the benefit of this disclosure that the DAC and analog input circuits are optically isolated from the logic and communications section of the board, as well as from each other to allows each section to float at a different voltage and keeps the EMI from the welding power supply inputs form interfering with welding power supply control module operation.

During a welding cycle the operator control panel 26 polls the welding power supply module 368 for output levels of voltage and amperage. This information is used to monitor the weld cycle and is output to the operator control panel 26.

The operator control panel 26 also receives a set of flags indicating the status for the welding power supply and the cooling water system. Cooling water is critical to the operation of the weld system, as the weld shoes, which act as a mold for the weld will melt if not cooled. The welding power supply module 368 is configured to either send a signal to the operator to fix the problem, or shutdown the welding power supply if the water fails, or can be configured to close the contactor of the welding power supply 36 if there is no water flow during a five-second period. The operator control panel 26 will not allow a welding cycle to start if there is no water flow and can shutdown a weld cycle upon notification by the welding power supply module 368. The operator is also informed of the problem on the operator control panel 26.

A more detailed description of the control system is provided in patent application Ser. No. 09/058,741 which is hereby incorporated by reference.

Accordingly, it will be seen that this invention provides a welding system and method which allows quick and easy fabrication of high quality vertical welds under varying conditions without requiring extensive set up time or use of heavy equipment, and which is particularly effective at installing stiffener plates onto structural beams or columns. Although the above description contains many specificities, these should not be considered as limiting the scope of the invention but as merely providing illustrations of some of the presently preferred embodiments of the invention. Thus, the scope of this invention should be determined by the appended claims and their legal equivalents.

What is claimed is:

1. A modular welding system, comprising:
   (a) a basic component system having an operator control module which controls a power supply and controls a wire feeder; and
   (b) a plurality of modular fixture component systems which interface with said basic component system, each of said modular fixture component systems controlled by said operator control module and having a particular fixture assembly which performs a particular type of weld.

2. The welding system of claim 1, wherein said basic component system further comprises a power supply control module which communicates inputs from said operator control module to said power supply.

3. The welding system of claim 2, wherein said basic component system further comprises a wire feeder control module which communicates inputs from said operator control module to said wire feeder.

4. The welding system of claim 3, wherein said basic component system further comprises an articulated boom which is configured to receive said modular fixture component system.

5. The welding system of claim 4, wherein said modular fixture component system comprises a weld torch which receives said at least one welding wire from said wire feeder.

6. The welding system of claim 5, where said modular fixture component system comprises an oscillator slide configured to oscillate said weld torch.

7. The welding system of claim 6, wherein said modular fixture component system comprises an oscillator control module in communication with said operator control module, said oscillator control module configured to control said oscillator slide.

8. The welding system of claim 5 wherein said modular fixture component system includes a stiffener fixture frame.

9. The welding system of claim 5 wherein said modular fixture component system includes a butt/tee fixture frame.

10. A modular welding system having a basic component system which comprises:
    a boom configured to receive at least one welding wire, said boom configured to provide a mechanical and electrical interface to a plurality of modular fixture component systems, each of said plurality of modular fixture component systems having a particular assembly that performs a particular type of weld;
    a wire feeder coupled to said boom, said wire feeder configured to transfer said at least one wire across said boom; and
    an operator's control module configured to control said wire feeder.

11. The basic component system of claim 10 further comprising a wire feed control module which receives wire feed signals from said operator's control module and controls the communications of said wire feed signals to said wire feeder.

12. The basic component system of claim 11 further comprising a power supply control module which receives power supply signals from said operator's control module and controls the communications of said power supply signals to a power supply.

13. The basic component system of claim 12 further comprising a wire straightener which straightens said at least one wire transferred by said wire feeder.

14. A modular fixture component system that interfaces mechanically and electrically with a basic component system, said basic component system having an operator control module that controls actions performed by said modular fixture component system, comprising:
- a weld torch configured to receive at least one welding wire from a wire feeder, said weld torch also configured to receive a consumable guide tube which receives said at least one wire, said weld torch configured to communicate power generated by a power supply to said guide tube; and
- an oscillator slide configured to oscillate said weld torch.

15. The modular fixture component system of claim 14 further comprising at least one manual slide to position said weld torch.

16. The modular fixture component system of claim 15 further comprising an oscillation control module which controls said oscillator slide.

17. The modular fixture component system of claim 16 further comprising a weld torch rotator configured to rotate said weld torch.

18. The modular fixture component system of claim 17 further comprising two weld shoes which define a weld cavity which receives said guide tube.

19. The modular fixture component system of claim 18 having a stiffener fixture frame.

20. The modular fixture component system of claim 18 having a butt/tee fixture frame.

21. A modular welding system comprising:
a basic component system including:
- an operator control module which controls a power supply and controls a wire feeder,
- a power supply control module which communicates inputs from said operator control module to said power supply,
- a wire feeder control module which communicates inputs from said operator control module to said wire feeder,
- an articulated boom;
a modular fixture system configured to interface with said articulated boom, said modular welding system having a weld torch which receives said at least one welding wire from said wire feeder, said modular fixture component system controlled by said operator module, and said modular fixture component system includes a stiffener fixture frame.

22. A modular welding system, comprising:
a basic component system, comprising:
- an operator control module which controls a power supply and controls a wire feeder,
- a power supply control module which communicates inputs from said operator control module to said power supply,
- a wire feeder control module which communicates inputs from said operator control module to said wire feeder,
- an articulated boom;
a modular fixture system configured to interface with said articulated boom, said modular welding system having a weld torch which receives said at least one welding wire from said wire feeder, said modular fixture component system controlled by said operator module, and said modular fixture component system includes a butt/tee fixture frame.

23. A modular welding system having a modular fixture component system, comprising:
- a weld torch configured to receive at least one welding wire from a wire feeder, said weld torch also configured to receive a consumable guide tube which receives said at least one wire, said weld torch configured to communicate power generated by a power supply to said guide tube;
- at least one manual slide to position said weld torch;
- a weld torch rotator configured to rotate said weld torch;
- two weld shoes which define a weld cavity which receives said guide tube;
- an oscillator slide configured to oscillate said weld torch;
- an oscillation control module which controls said oscillator slide; and
- a stiffener fixture frame.

24. A modular welding system having a modular fixture component system, comprising:
- a weld torch configured to receive at least one welding wire from a wire feeder, said weld torch also configured to receive a consumable guide tube which receives said at least one wire, said weld torch configured to communicate power generated by a power supply to said guide tube;
- at least one manual slide to position said weld torch;
- a weld torch rotator configured to rotate said weld torch;
- two weld shoes which define a weld cavity which receives said guide tube;
- an oscillator slide configured to oscillate said weld torch;
- an oscillation control module which controls said oscillator slide; and
- a butt/tee fixture frame.

* * * * *